May 5, 1931.  H. R. BRAND  1,803,522
MECHANISM AND METHOD FOR CONTROLLING BUSINESS
Filed March 30, 1922   20 Sheets-Sheet 1
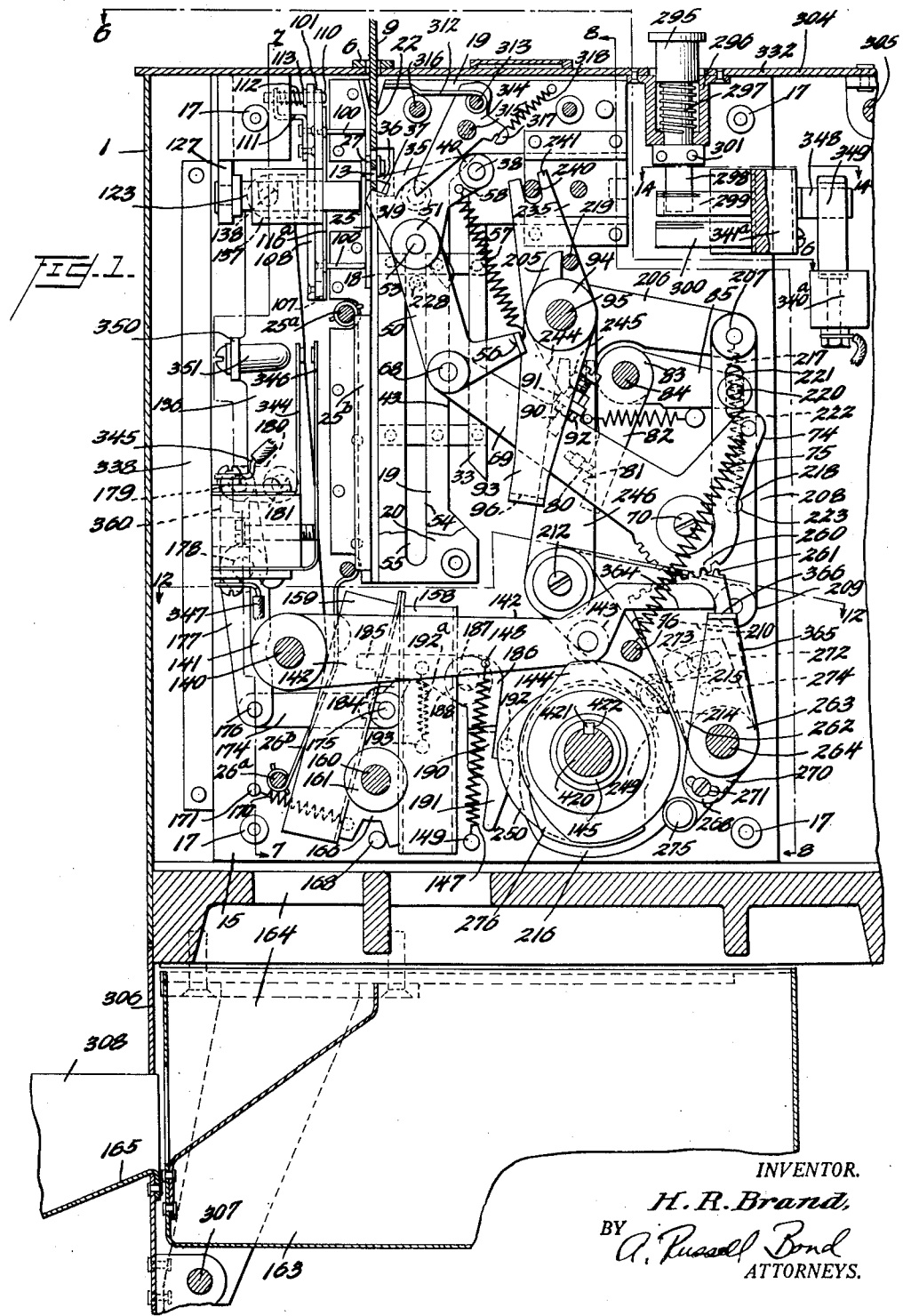
INVENTOR.
H. R. Brand,
BY
ATTORNEYS.

May 5, 1931.   H. R. BRAND   1,803,522
MECHANISM AND METHOD FOR CONTROLLING BUSINESS
Filed March 30, 1922    20 Sheets-Sheet 2
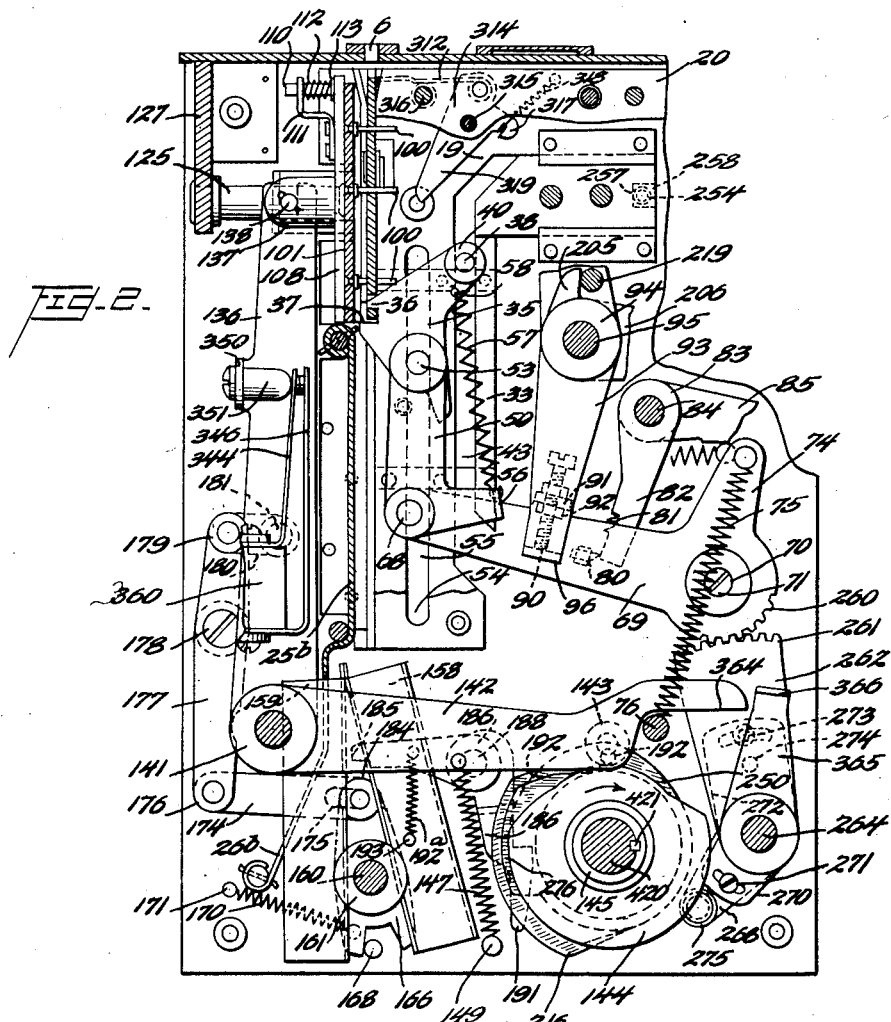
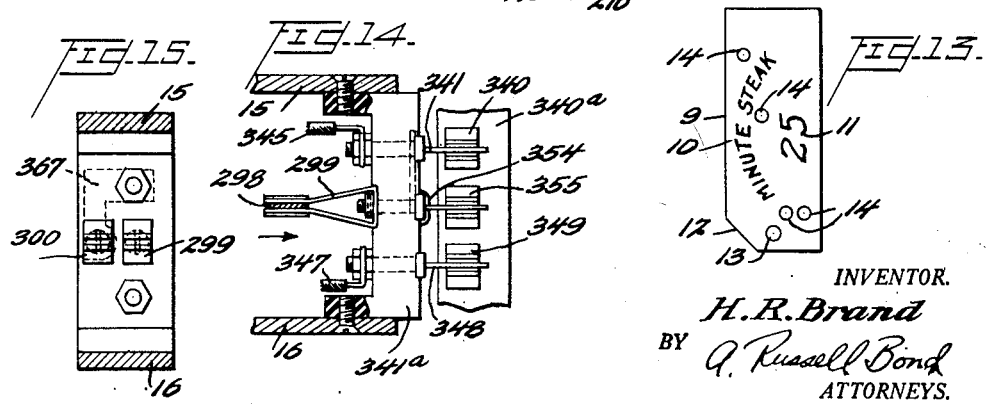
INVENTOR.
H. R. Brand
BY G. Russell Bond
ATTORNEYS.

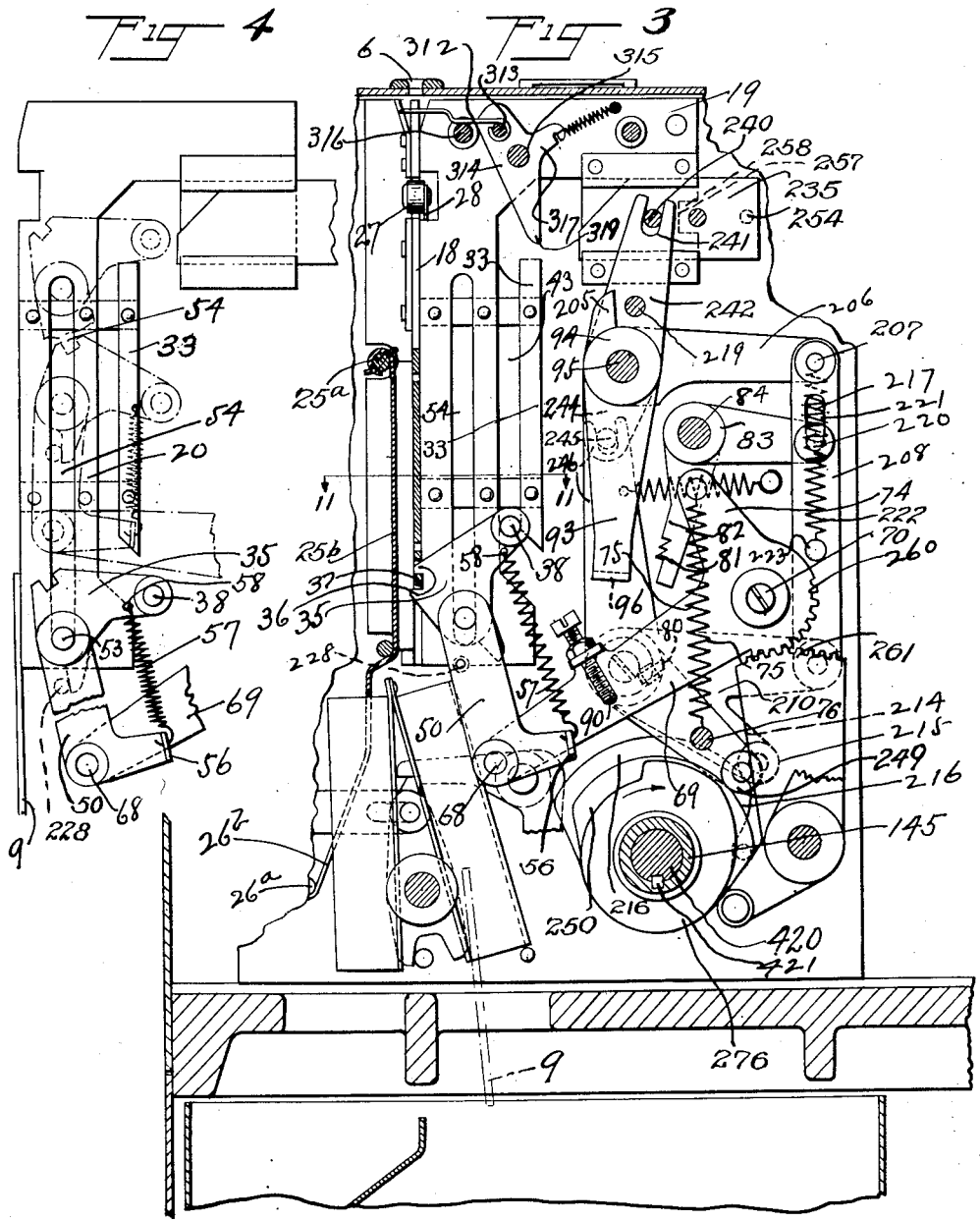

May 5, 1931.  H. R. BRAND  1,803,522
MECHANISM AND METHOD FOR CONTROLLING BUSINESS
Filed March 30, 1922   20 Sheets-Sheet 4
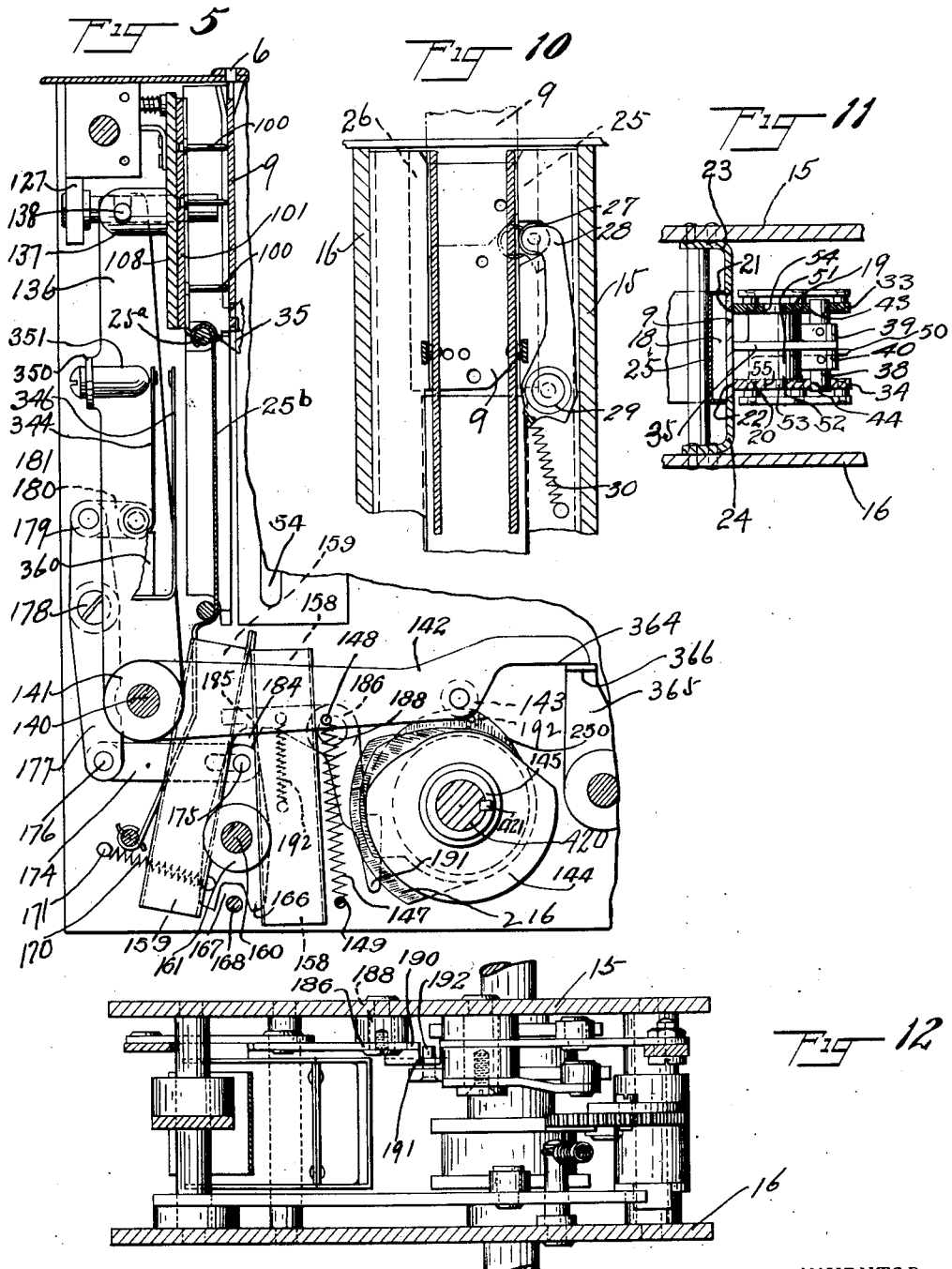

May 5, 1931.  H. R. BRAND  1,803,522
MECHANISM AND METHOD FOR CONTROLLING BUSINESS
Filed March 30, 1922  20 Sheets-Sheet 5
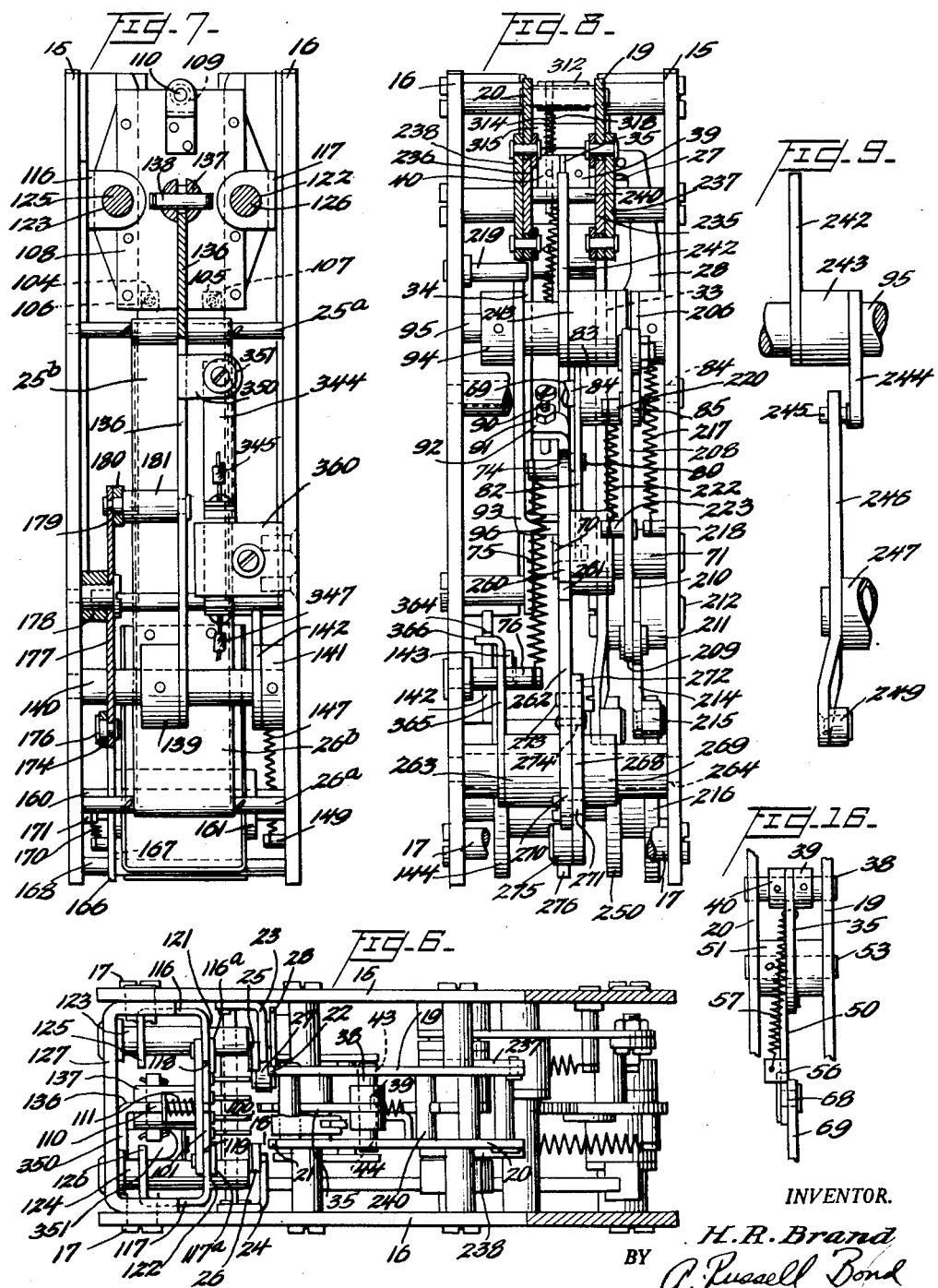
INVENTOR.
H. R. Brand
BY A. Russell Bond
ATTORNEYS.

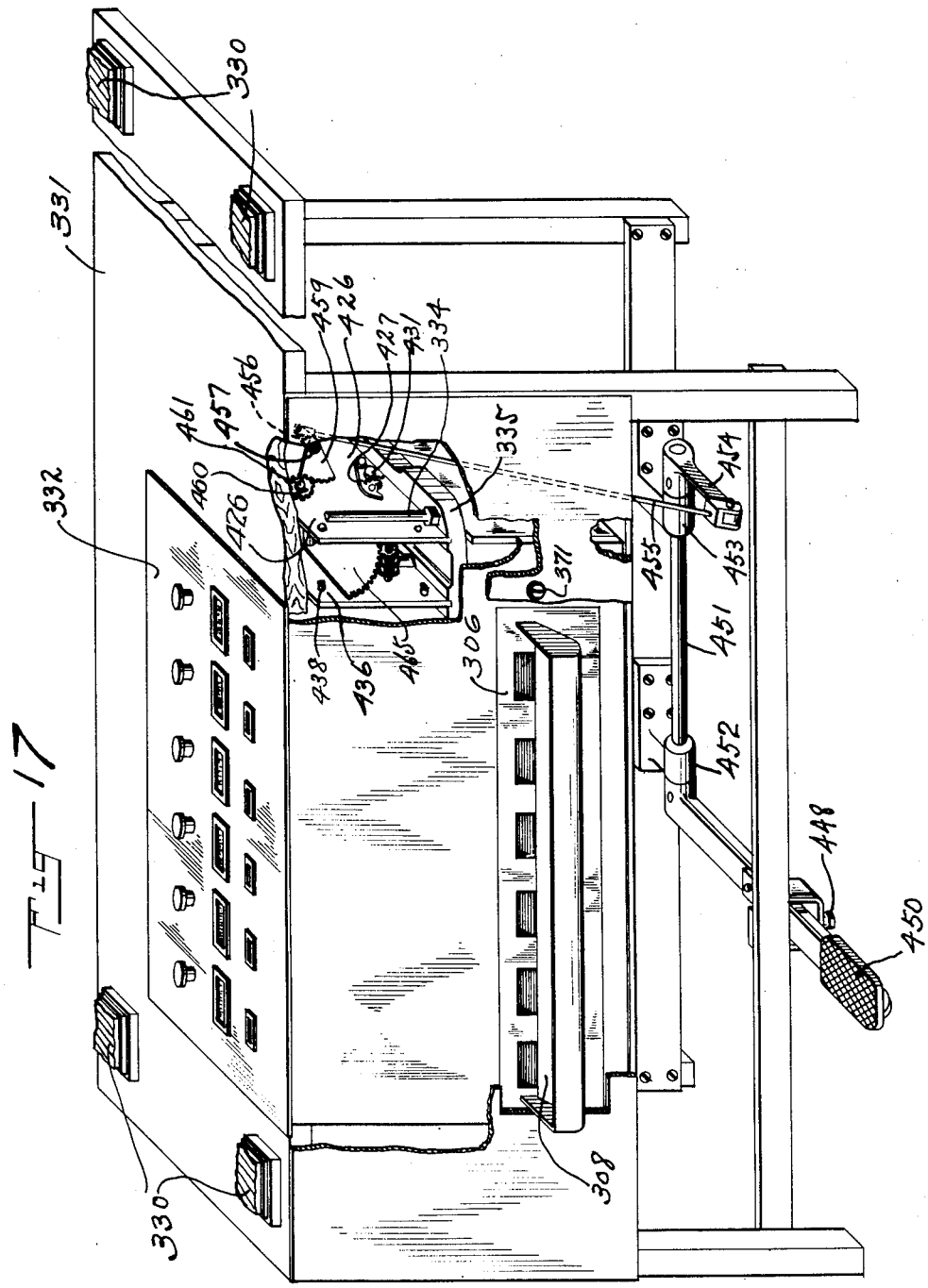

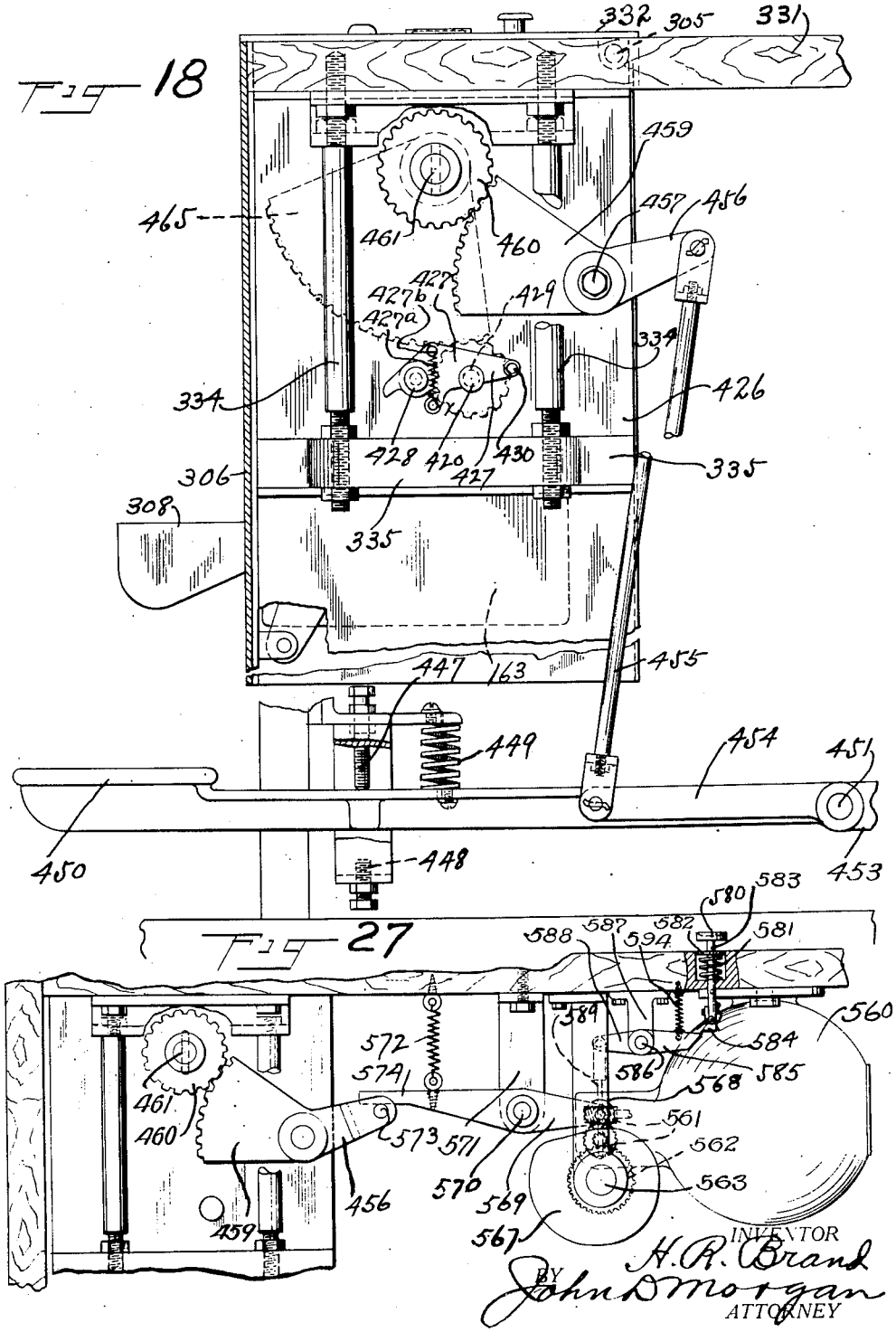

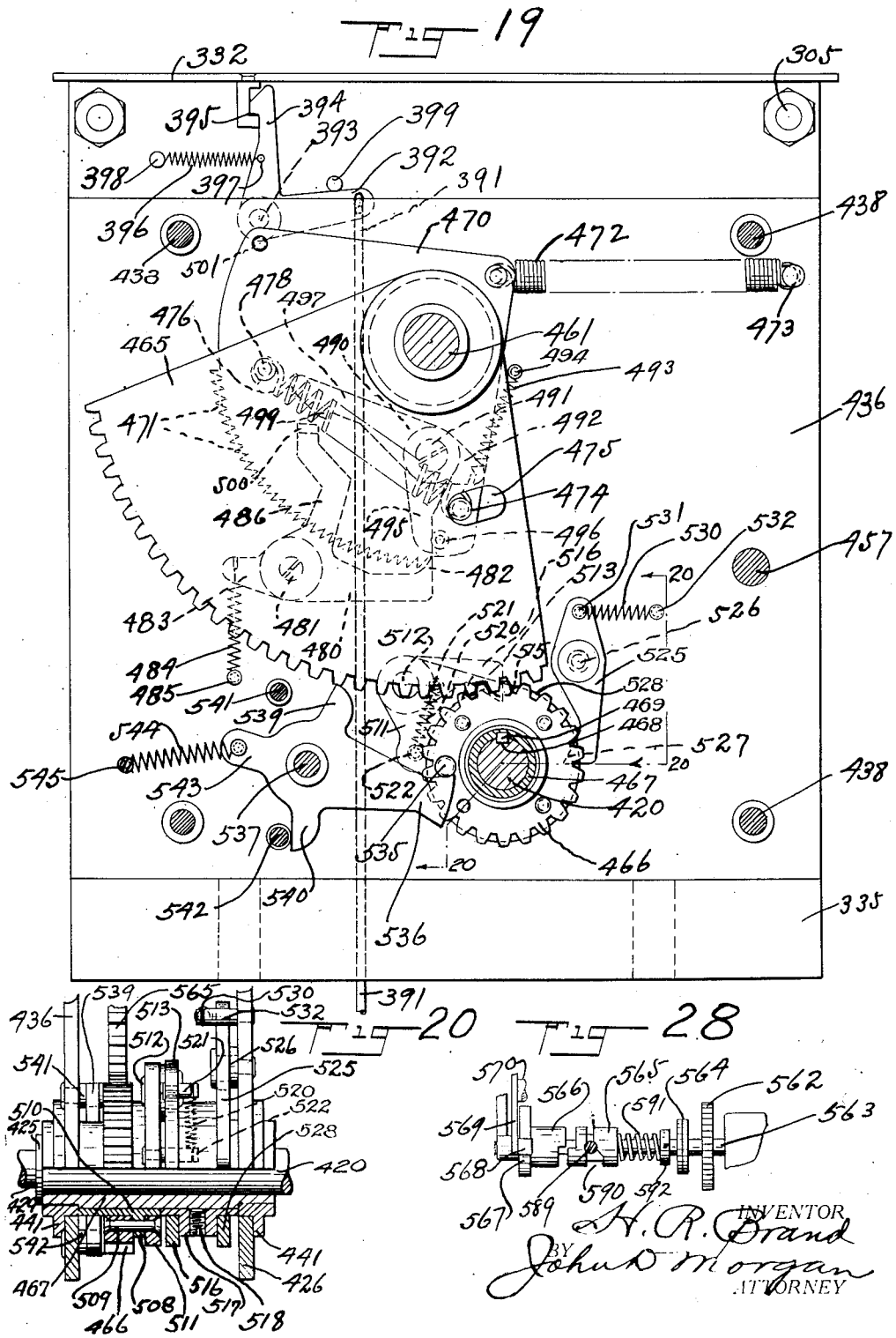

May 5, 1931.  H. R. BRAND  1,803,522
MECHANISM AND METHOD FOR CONTROLLING BUSINESS
Filed March 30, 1922  20 Sheets-Sheet 9
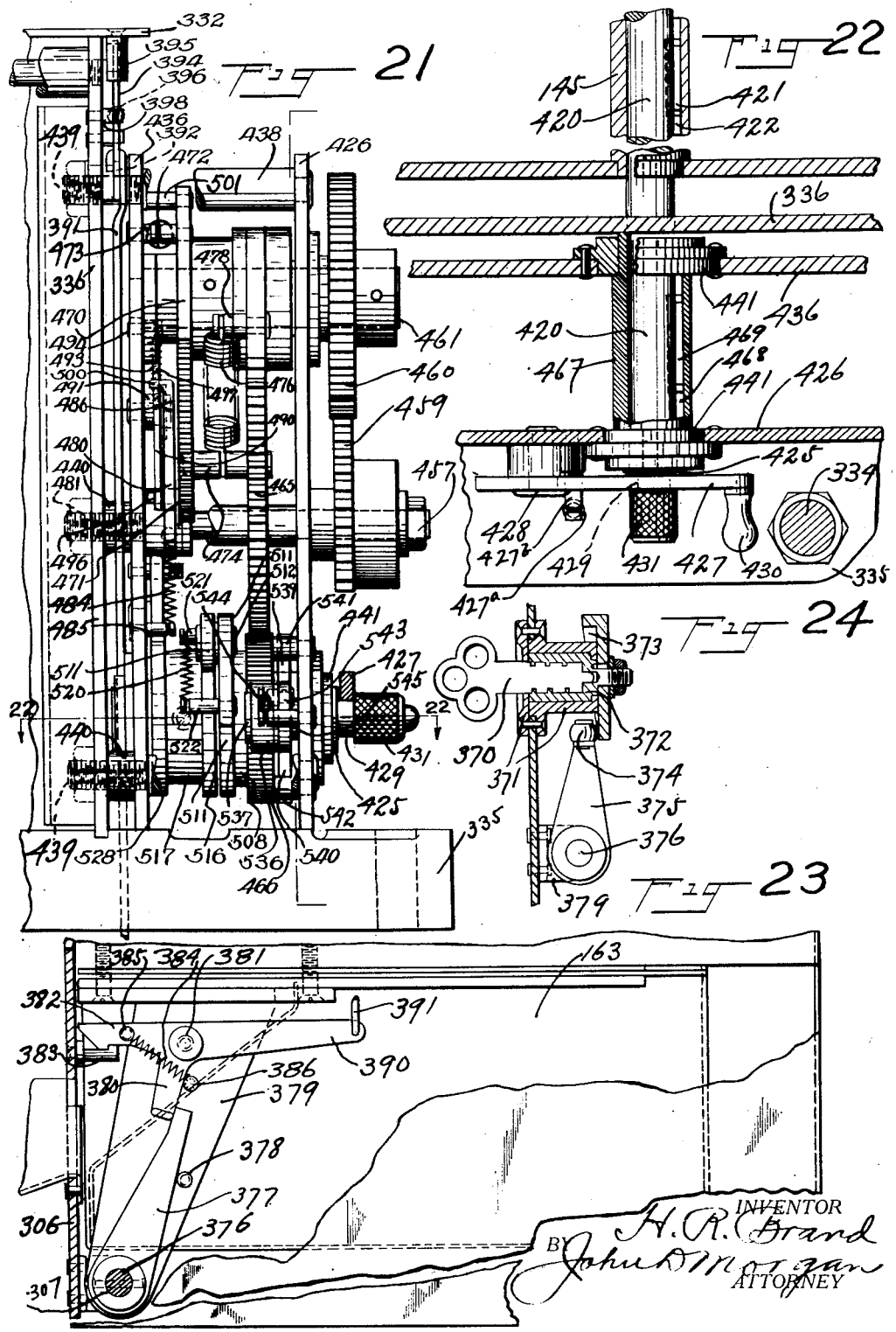
INVENTOR
H. R. Brand
BY John D. Morgan
ATTORNEY May 5, 1931. H. R. BRAND 1,803,522
MECHANISM AND METHOD FOR CONTROLLING BUSINESS
Filed March 30, 1922 20 Sheets-Sheet 10
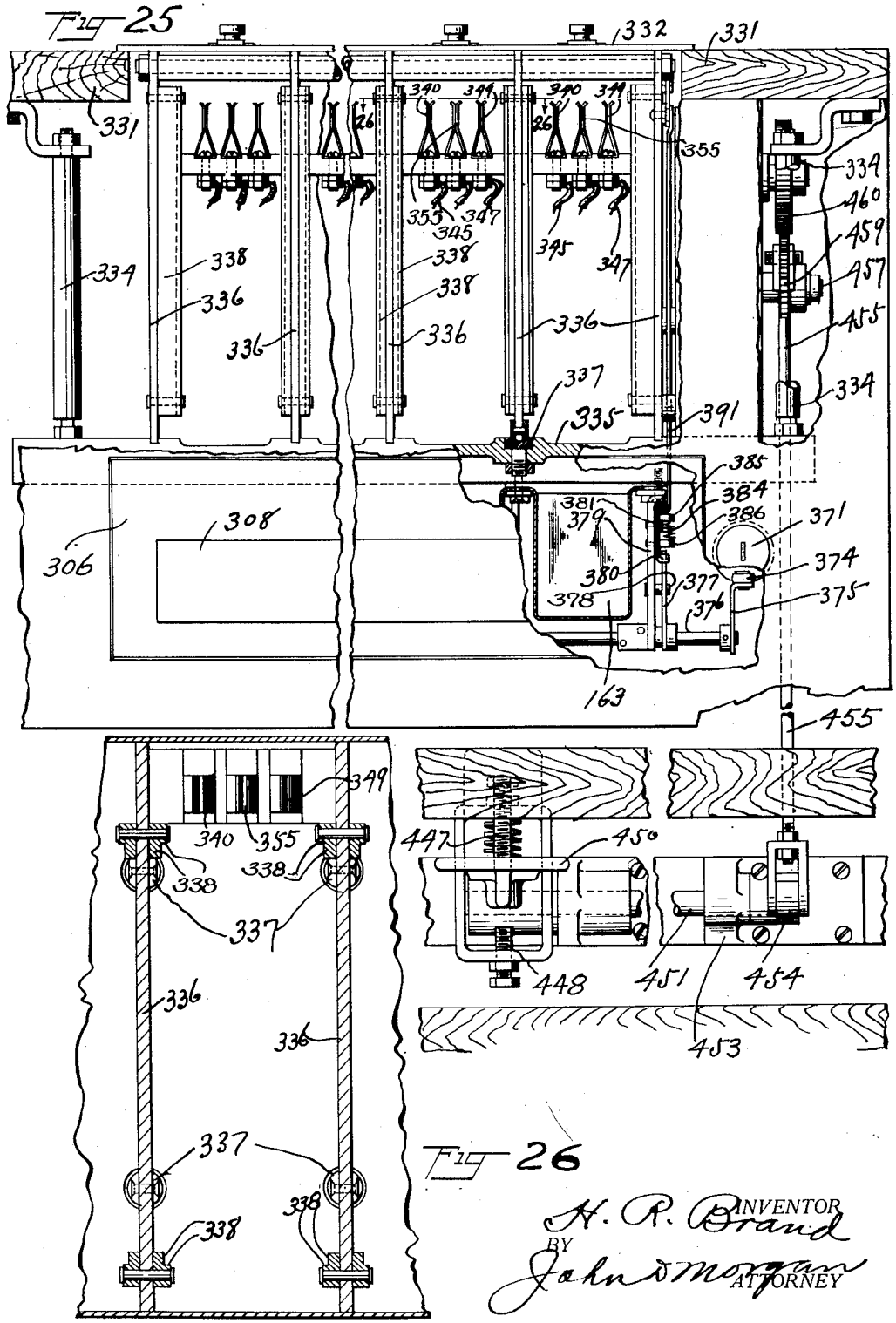

May 5, 1931.    H. R. BRAND    1,803,522
MECHANISM AND METHOD FOR CONTROLLING BUSINESS
Filed March 30, 1922    20 Sheets-Sheet 11
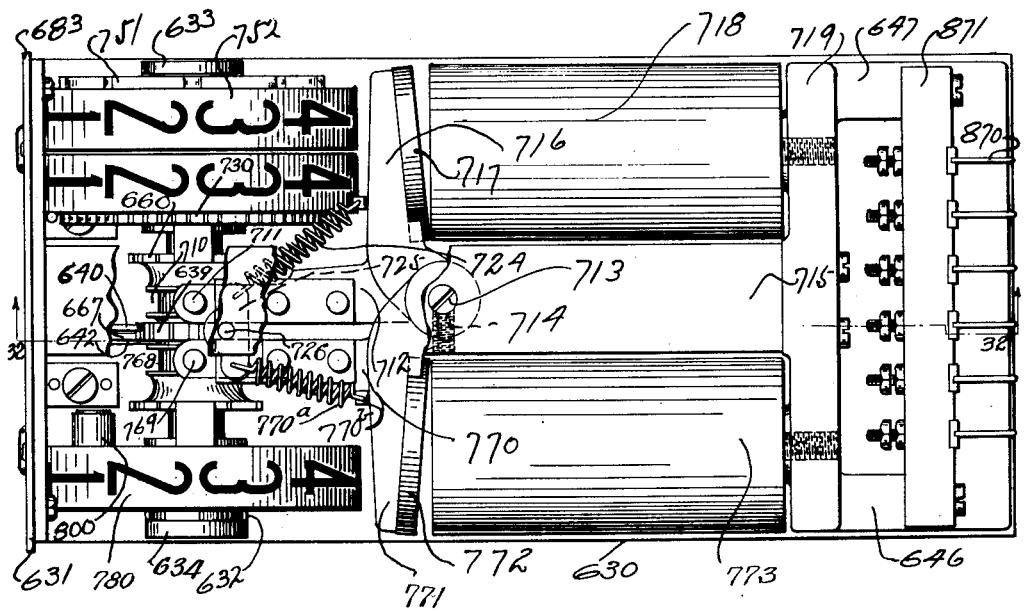
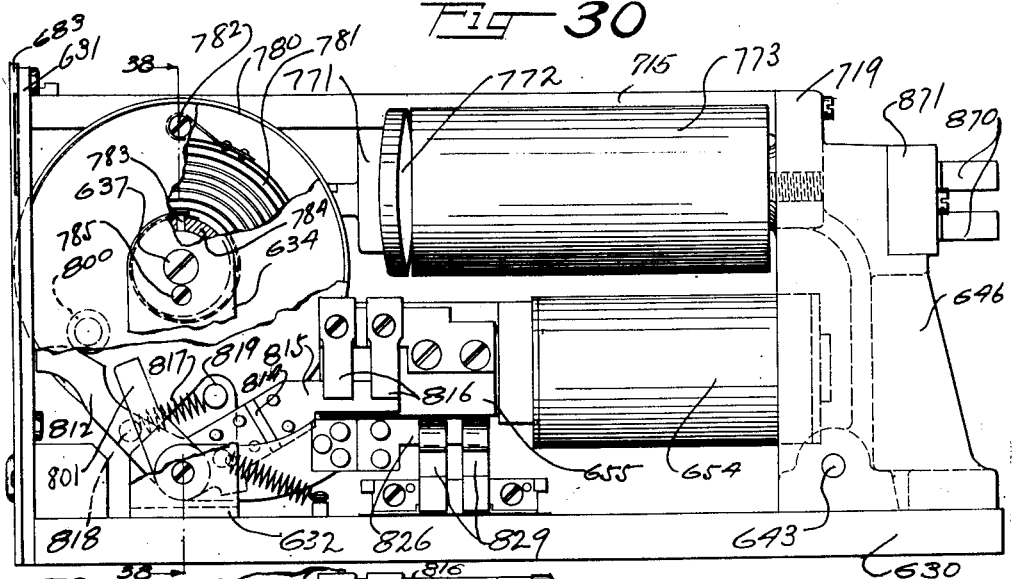

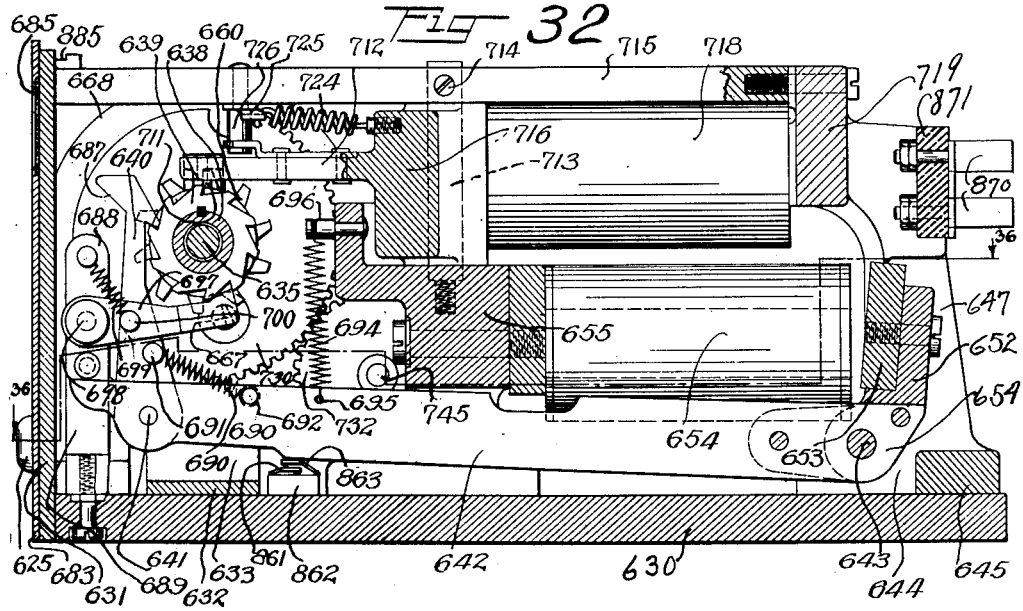
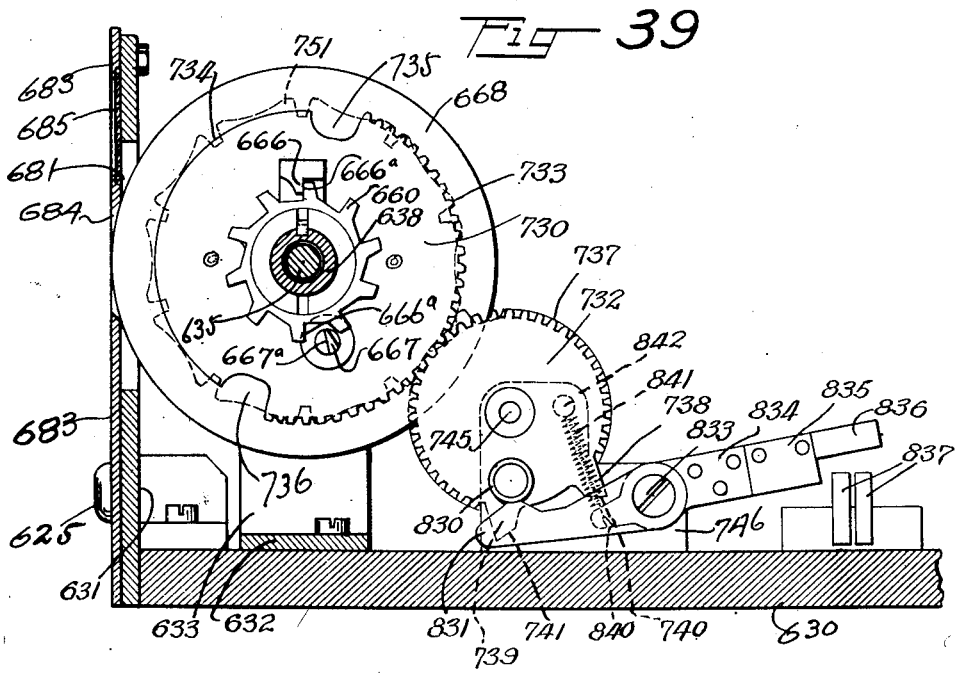

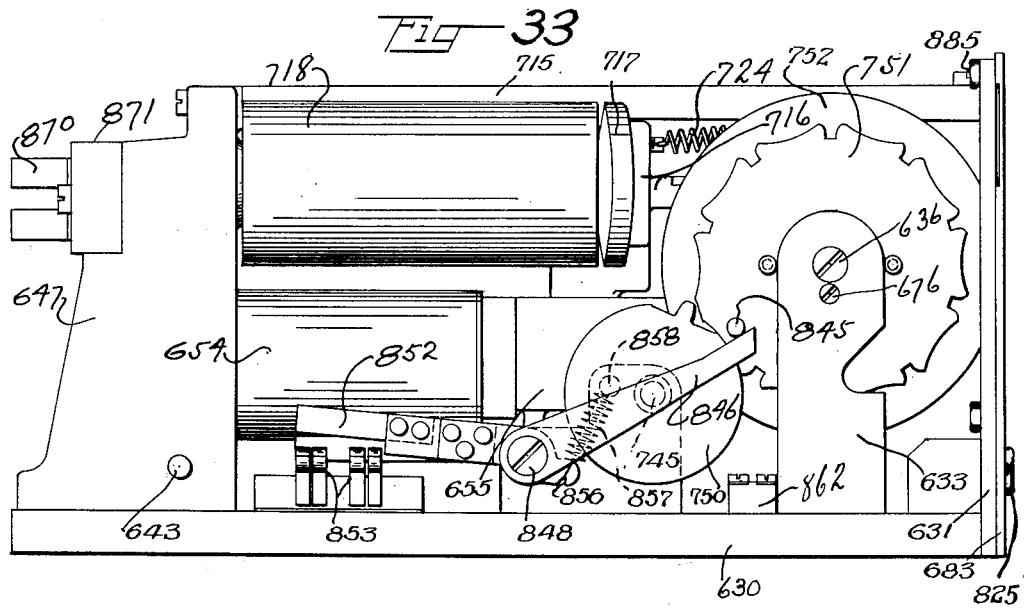
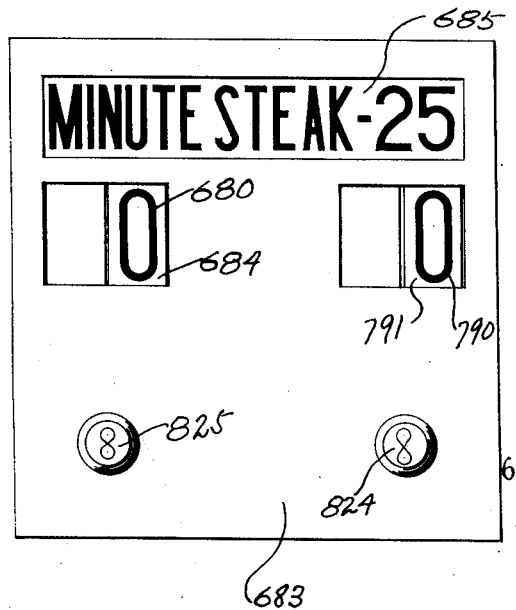
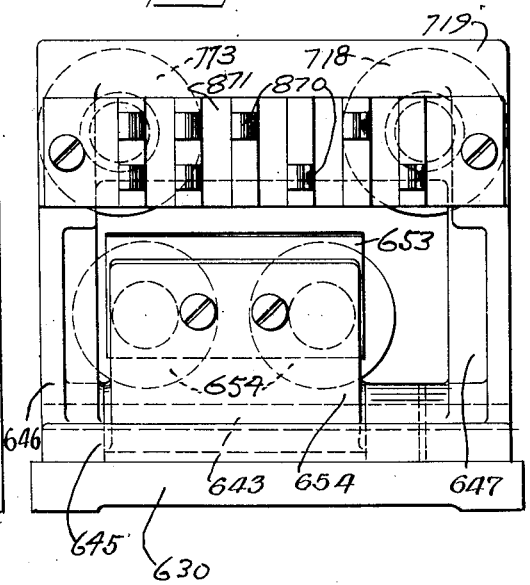

May 5, 1931.  H. R. BRAND  1,803,522
MECHANISM AND METHOD FOR CONTROLLING BUSINESS
Filed March 30, 1922   20 Sheets-Sheet 14
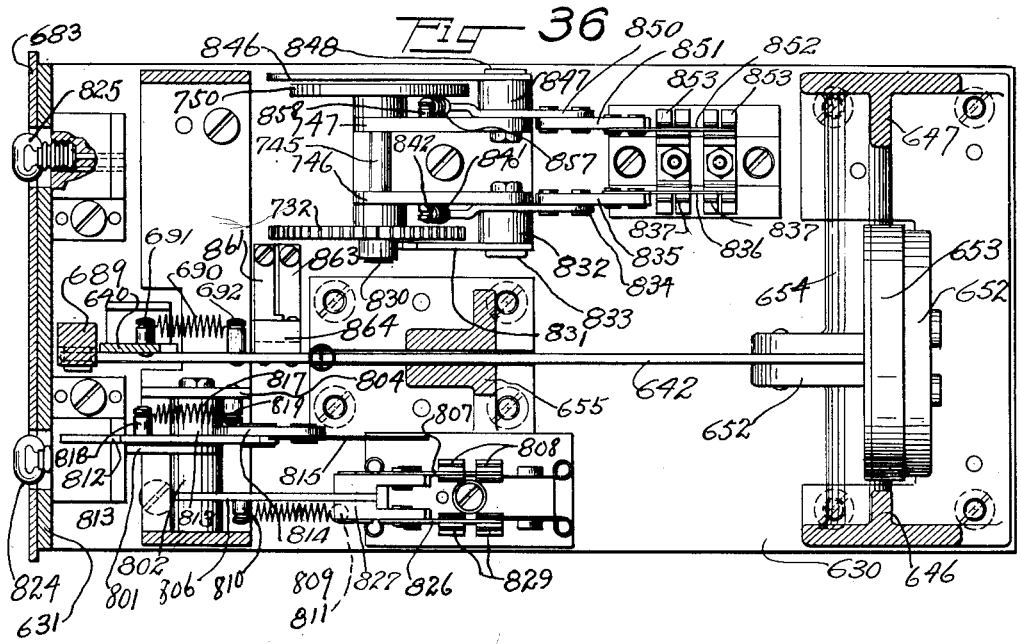
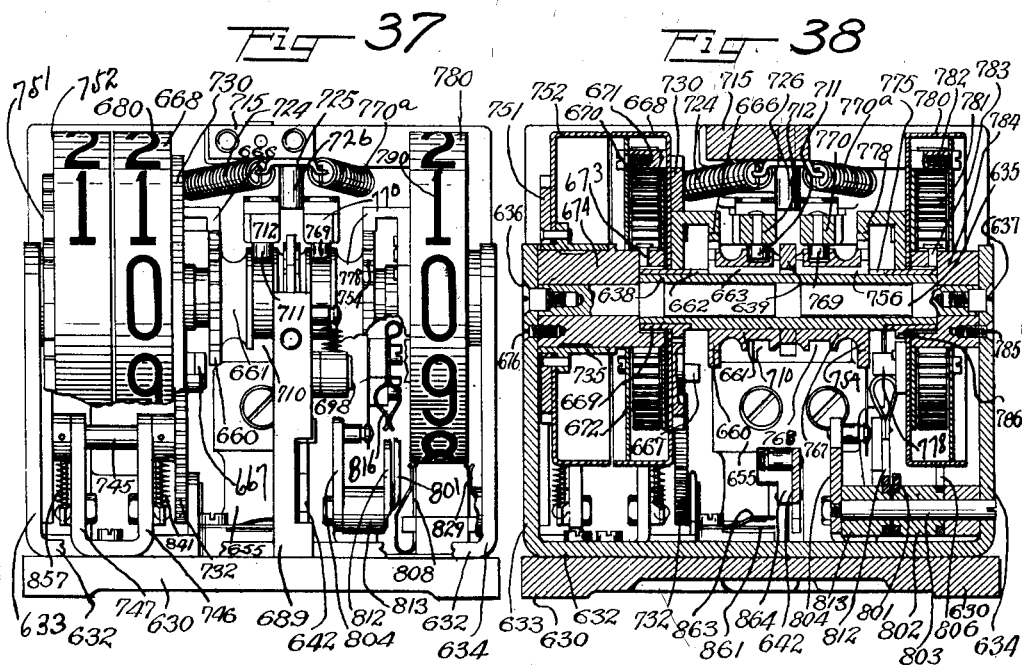

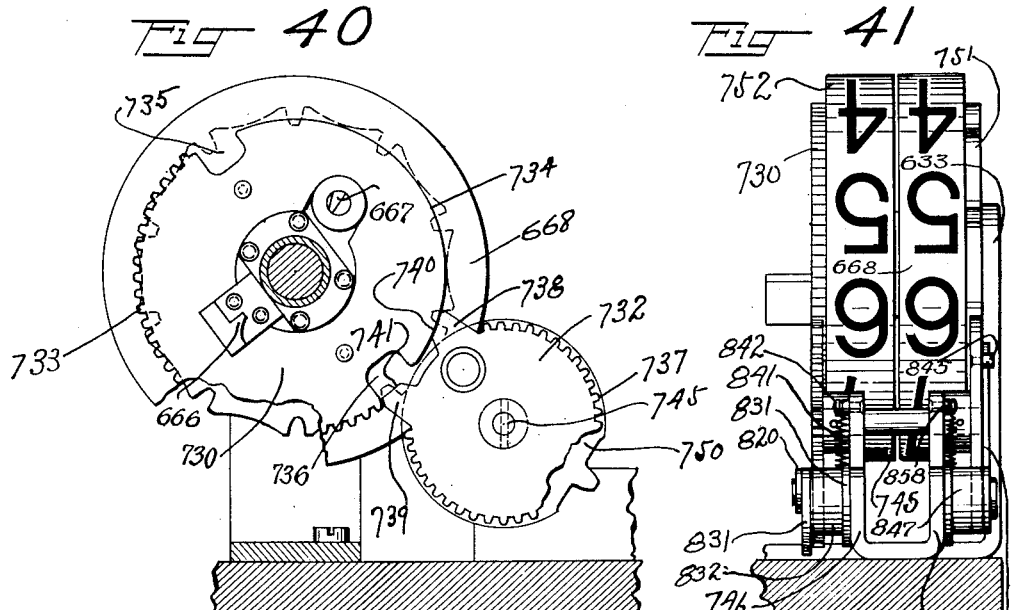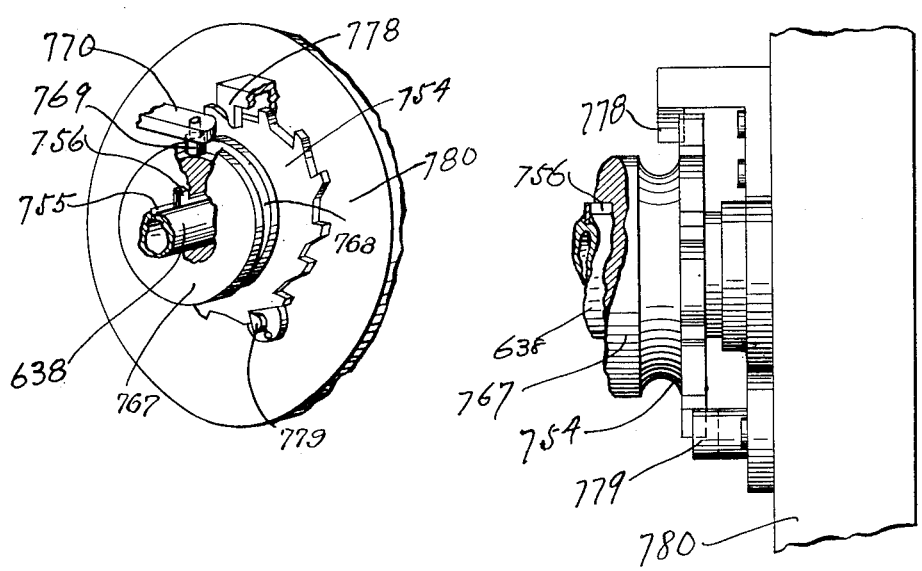

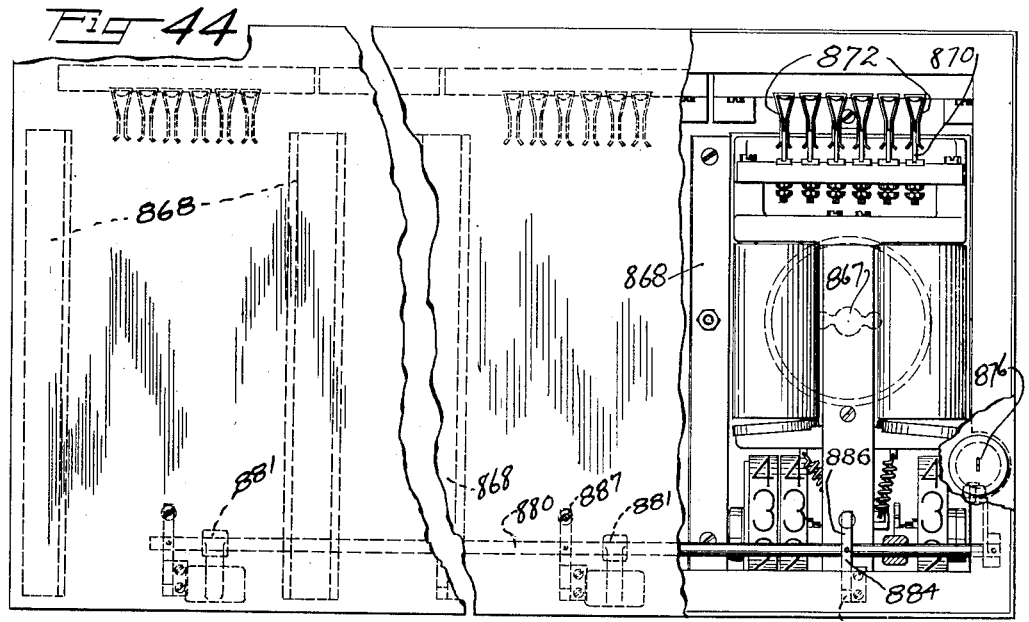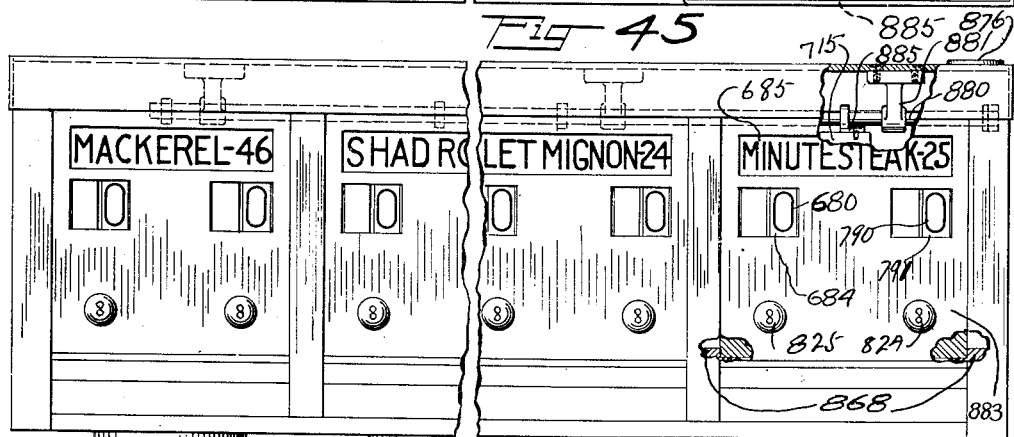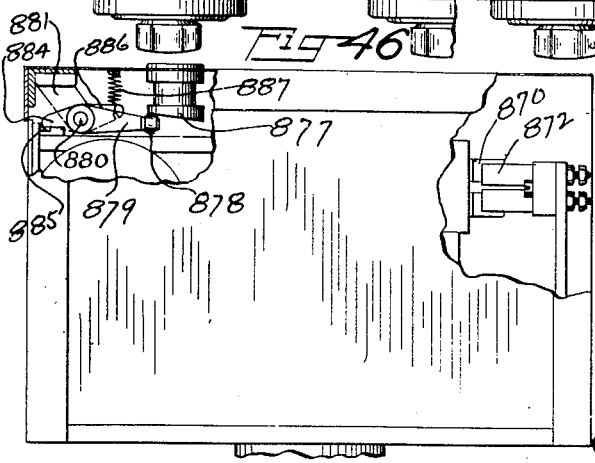

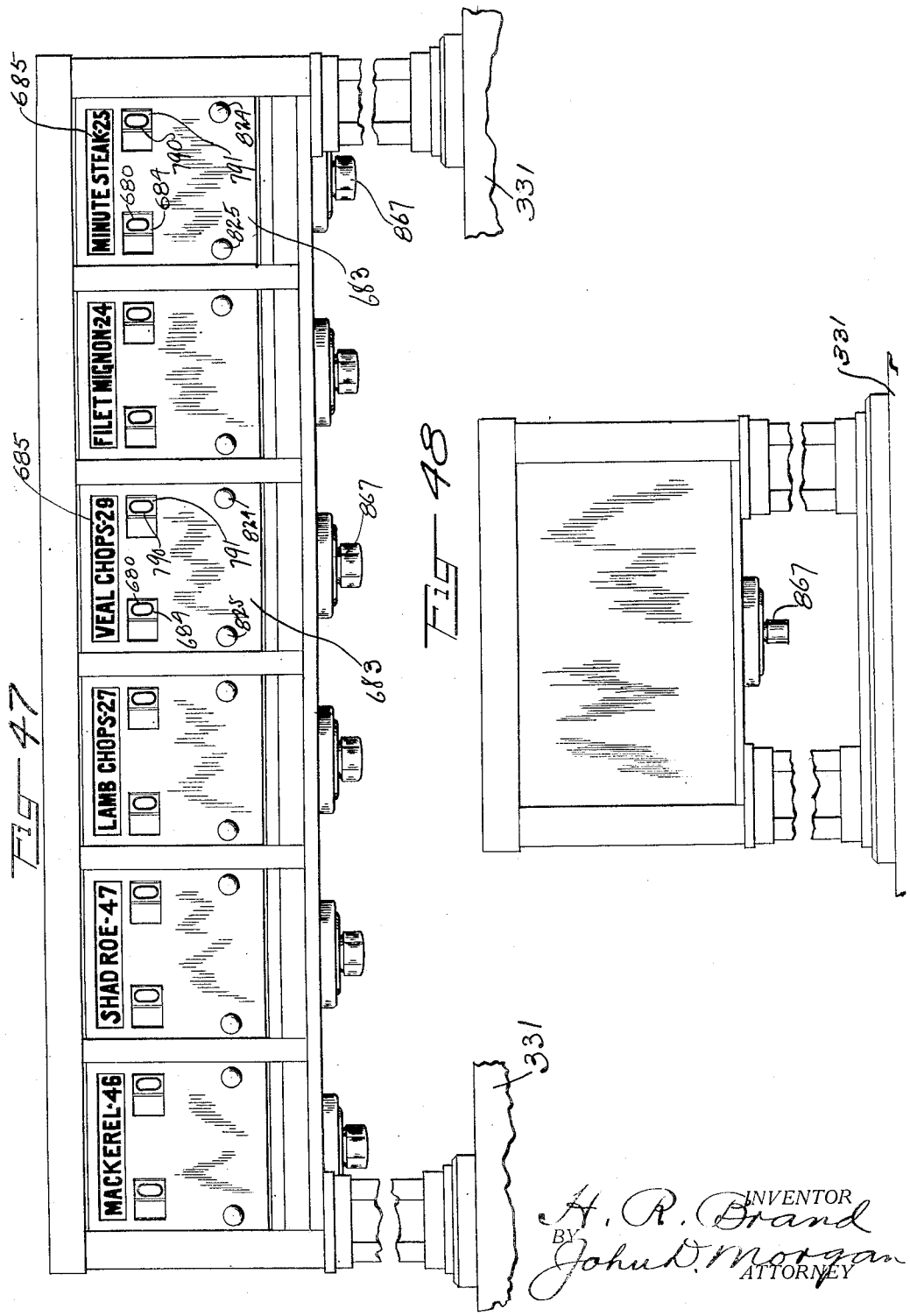

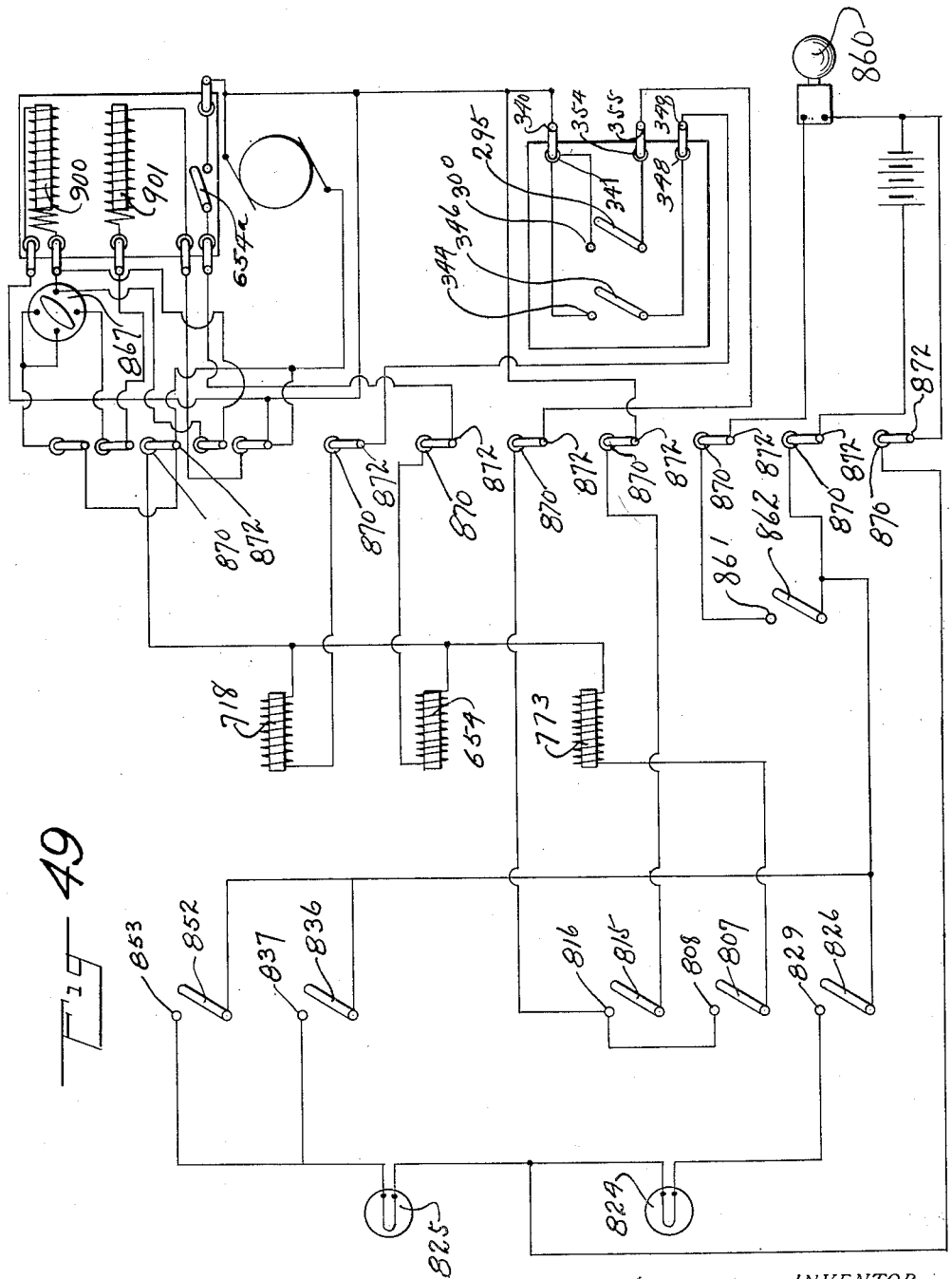

May 5, 1931.  H. R. BRAND  1,803,522
MECHANISM AND METHOD FOR CONTROLLING BUSINESS
Filed March 30, 1922    20 Sheets-Sheet 19
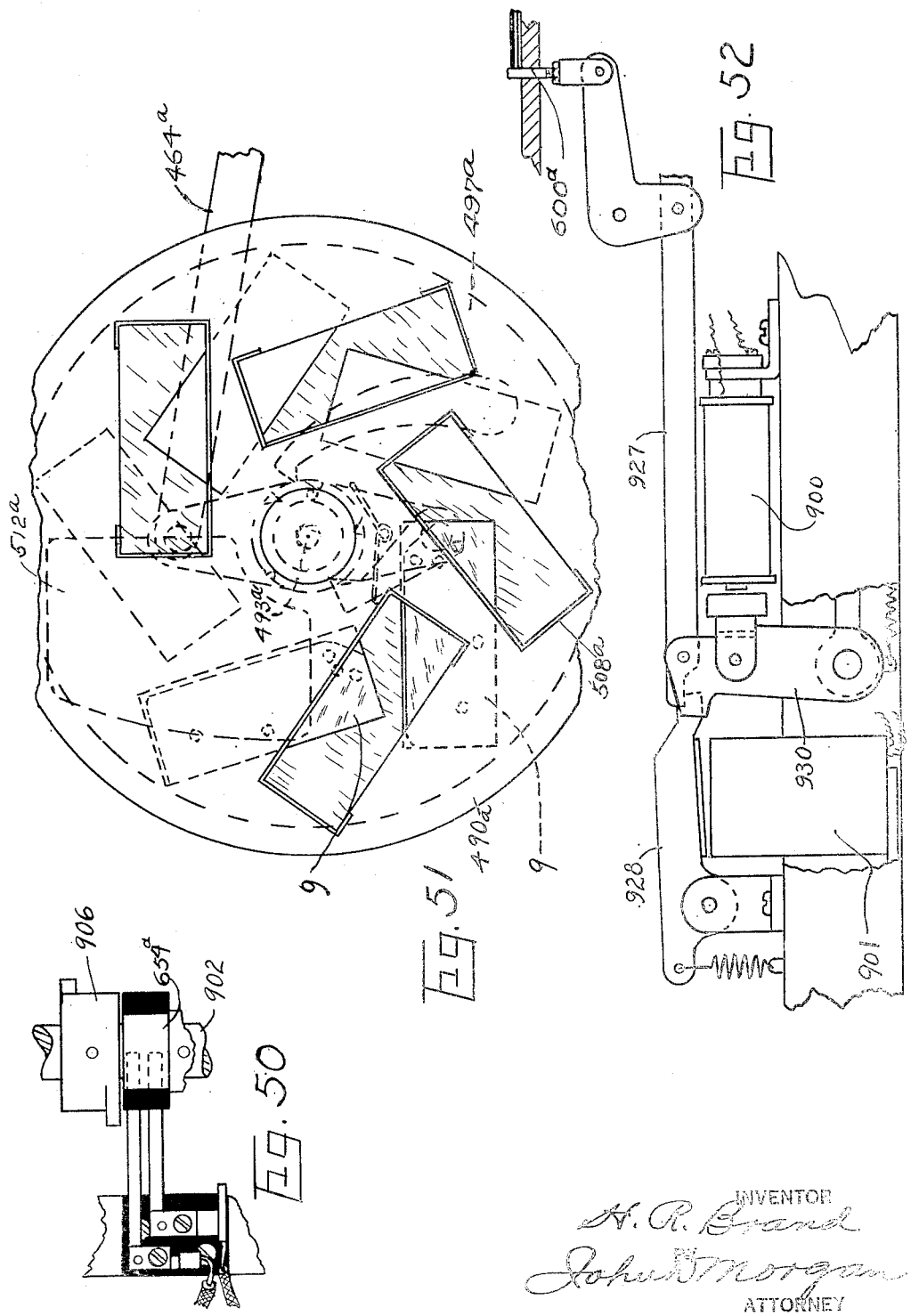
INVENTOR
H. R. Brand
John Morgan
ATTORNEY

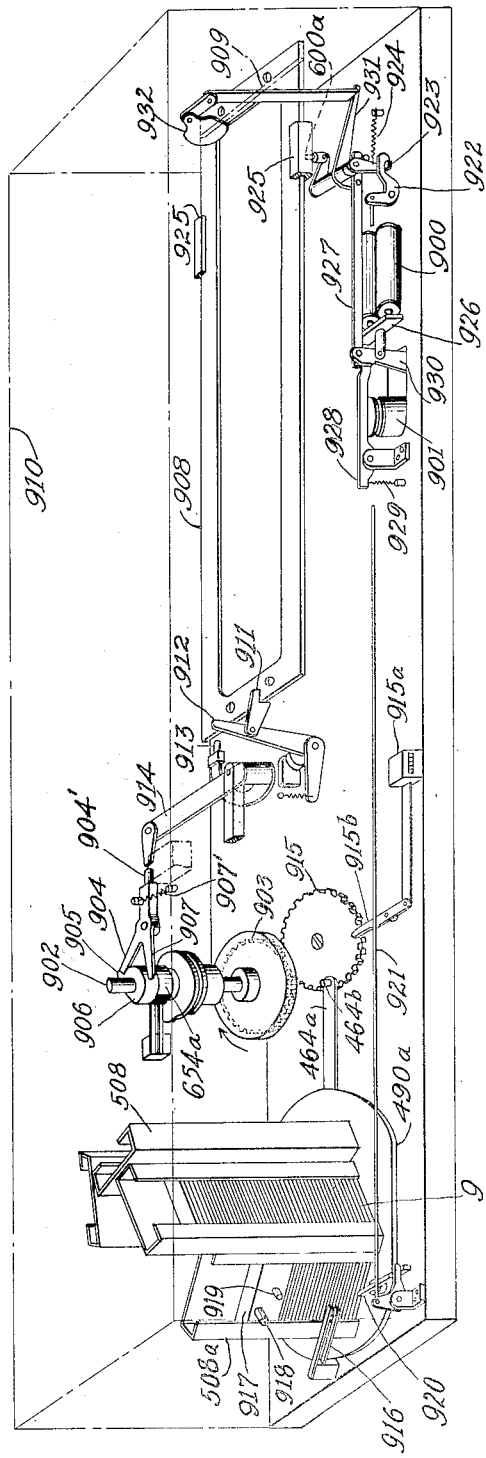

Patented May 5, 1931

1,803,522

UNITED STATES PATENT OFFICE

HARRY RUSSELL BRAND, OF NEW YORK, N. Y.

MECHANISM AND METHOD FOR CONTROLLING BUSINESS

Application filed March 30, 1922. Serial No. 548,250.

The invention relates to a token receiving and recording mechanism constituting part of a system and automatic mechanism for the involuntary recordation of the exact and immediate status and transactions of a business, such as charging, crediting, pricing, totaling, tabulating, checking and other control of the sale, inventorying, or other dispensing or handling of commodities; and in certain of its aspects, as here embodied, it relates more particularly to such a system and mechanism adapted for restaurants or other food purveying or serving establishments.

Other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation of a machine embodying the invention with the portions of the inclosing casing cut away and partly in section;

Fig. 2 is a view corresponding to Fig. 1, but omitting the enclosing casing and other parts, and with the upper right-hand part of the mechanism broken away, and showing the mechanism at a later stage in the travel of the token through the machine;

Fig. 3 is a fragmentary elevation, similar to Fig. 2, but with additional parts omitted, and showing the mechanism at a still later stage in the progress of the token through the machine;

Fig. 4 is a detached fragmentary elevation of that portion of the mechanism which is shown near the central part of Figs. 1, 2 and 3, but showing the mechanism returning to token-receiving position after the deposit of the token;

Fig. 5 is a fragmentary elevation of the mechanism shown at the left-hand side and the bottom of Figs. 1 and 2, and illustrating the operation of rejecting the wrong token;

Fig. 6 is a top plan of the machine, with the casing removed, and with parts in section along the line 6—6 of Fig. 1 and with certain parts omitted;

Fig. 7 is a transverse vertical section, taken on the line 7—7 of Fig. 1;

Fig. 8 is a transverse vertical section, taken on the line 8—8 of Fig. 1;

Fig. 9 is a detached detail in elevation of part of the mechanism shown in Figs. 1 and 8;

Fig. 10 is a fragmentary detail elevation of the mechanism for preventing insertion of an improperly positioned token into the machine;

Fig. 11 is a fragmentary horizontal section, on the line 11—11 of Fig. 3;

Fig. 12 is a transverse horizontal section on the line 12—12 of Fig. 1, and with parts omitted;

Fig. 13 is a detail of a form of token for use with the machine;

Fig. 14 is a fragmentary transverse horizontal section, taken on the line 14—14 of Fig. 1, and showing the circuit terminals;

Fig. 15 is a fragmentary detail of an elevation of parts shown in Fig. 14, looking in the direction of the arrow;

Fig. 16 is a fragmentary detail in elevation of a part of the token carrier;

Fig. 17 is a front perspective view, with parts broken away, of a battery of the token-receiving mechanisms in an inaccessible casing and with common actuating means therefor;

Fig. 18 is a side elevation of the actuating means shown in Fig. 17;

Fig. 19 is a side elevation, on an enlarged scale, of a part of the mechanism shown in the upper part of Fig. 18, and with other parts showing;

Fig. 20 is a fragmentary elevation looking at the lower part of Fig. 19 from the right;

Fig. 21 is a side elevation looking at Fig. 19 from the left;

Fig. 22 is a fragmentary horizontal section substantially on the line 22—22 of Fig. 21, but showing certain parts which are omitted from Fig. 21;

Fig. 23 is a fragmentary detail of a part of the locking mechanism;

Fig. 24 is a fragmentary detail, largely in section, of a part of the locking mechanism;

Fig. 25 is a view, partly in elevation and partly in vertical section, showing the mounting and connections for the token depositing units within the casing with parts omitted, and showing also the locking means;

Fig. 26 is a horizontal section taken on the line 26—26 of Fig. 25;

Fig. 27 is a side elevation of a form of power operating means for a battery of the token receivers, such as are shown in Fig. 17 and Fig. 25;

Fig. 28 is a fragmentary detail of the one-revolution driving mechanism shown in Fig. 27;

Fig. 29 is a top plan of the automatically token-operated annunciator, removed from its inaccessible casing;

Fig. 30 is a side elevation of the mechanism of Fig. 29, looking thereat from the adjacent side;

Fig. 31 is a fragmentary detail showing the mechanism at the lower left hand part of Fig. 30 in a different position;

Fig. 32 is a longitudinal vertical section taken substantially on the line 32—32 of Fig. 29;

Fig. 33 is a side elevation of the mechanism shown in Fig. 29, looking thereat from the top of the page;

Fig. 34 is a front view of Figs. 29 and 30, looking thereat from the left hand side, or looking at Fig. 33 from the right-hand side;

Fig. 35 is an end or back elevation, looking at Figs. 29 and 30 from the right hand side, and Fig. 33 from the left-hand side;

Fig. 36 is a horizontal section taken on the line 36—36 of Fig. 32;

Fig. 37 is a view similar to Fig. 34 with the front plate removed;

Fig. 38 is a vertical transverse section on the line 38—38 of Fig. 30;

Fig. 39 is a fragmentary detail in elevation, showing the normal or initial position of the gearing for actuating the dials;

Fig. 40 shows a different position of a portion of the mechanism shown in Fig. 39;

Fig. 41 is a detail elevation looking at Figs. 39 and 40 from the right;

Fig. 42 is a fragmentary perspective view showing details of the stepping back mechanism;

Fig. 43 is an enlarged, fragmentary detail of the dial-operating mechanism;

Fig. 44 is a plan of the inaccessible casing for a battery of the annunciators, with parts broken away;

Fig. 45 is a front view corresponding to Fig. 44;

Fig. 46 is a side elevation corresponding to Figs. 44 and 45, looking thereat from the right;

Fig. 47 is a front elevation of a battery of the annunciators in their mounting, preferably in connection with a corresponding battery of token receivers;

Fig. 48 is a side elevation looking at Fig. 47 from the right; and

Fig. 49 is a wiring diagram.

Fig. 50 is a detached view showing the commutator switch fully described in my copending application Ser. No. 527,516;

Fig. 51 is a detached view showing the token ejecting means fully described in my co-pending application Ser. No. 527,516;

Fig. 52 is a detached view showing the locking and unlocking device fully described in my copending application Ser. No. 527,516.

Fig. 53 is a perspective skeleton view of the controller described in full in my co-pending application Serial No. 527,516, and shows the token ejector mechanism and such other parts as cooperate with the token receiver and annunciator.

An object of the present invention in itself, and also in conjunction with my other cooperating inventions, is to provide an intrinsic or involuntary control for the business, which is operated and expressed by the business itself whereby the complete and immediate information requisite an helpful for the correct, efficient and profitable management of the business is immediately conveyed or rendered available to the managing authority essentially during and by reason of the transaction of the business.

By my general invention the transaction of the business, without impeding such transaction, is conducted so that the business of each day produces immediately available for the controlling person or authority the information necessary or pertinent to the immediate management of the business. In other words, at the close of business each day, the managing authority has all essential facts, such as volume and value of sales of each commodity, prices of units, identity of salesmen and supplymen or other dispensers, inventory decreases or changes, and so on.

That is, immediately at the end of each day there is infallibly furnished involuntarily (as do in their spheres the compass, the steam gage, the speedometer and the like), without the assistance or employment of any kind of mathematical or accounting labor, all requisite managerial data, much of which data in the present usual and ordinary transaction of business is not obtainable at all, and that data which is obtainable in the present and ordinary transaction of business can be deduced and gotten together only by much extra labor and expense.

The invention provides means and instrumentalities which involuntarily compute and indicate business transactions.

In addition my invention at the end of each day immediately detects losses, that is, discrepancies between sales and inventories or supplies.

The instrumentalities employed in carrying out my invention and which cooperate therewith comprise the controller, which is exemplarily disclosed diagrammatically, at a sales, or equivalent, station, and cooperating therewith a token receiver or depository and an order or transaction recording and announcing device, located at the supply station; and preferably also a totalizing machine, all operated necessarily and involuntarily in the transaction of the business and without impeding or incumbering the business, but on the contrary, tending to expedite and facilitate it.

The various devices or instrumentalities broadly referred to above are referred to more in detail hereinafter, including references to copending applications in which they are exemplarily disclosed in detail.

By my system and mechanism of commodity purveying the selling agent is compelled involuntarily to mechanically make a record which is non-accessible to him and accessible only to his supervisor of the kind and quantity of commodity sold in a given transaction together with the identity of the selling or purveying agent and is also compelled involuntarily to automatically make or record a demand on a supplying agent or source for the particular kind and quantity of commodity, and as a result of recording the transaction is provided with a demanding means to be served on the supplying agent, who in turn must deposit or make a record against himself by means of said demanding means, which record is likewise non-accessible to himself and is only accessible to said supervisor. The demanding means referred to is preferably a token or coin delivered from an inaccessible source to the selling or purveying agent while he is recording the transaction and which must be deposited preferably by the supplying agent in a depository, accessible only to his supervisor, in order to credit said supplying agent for the commodity demanded by and delivered to the selling or purveying agent.

The present application is directed primarily to the control and recordation of the business, and the transfer of the commodities, at the supply station, but this control and recordation, in the complete system, is interlocked with, and cooperates with, the control and recordation of the business at the selling station. It will be understood, however, that the various mechanisms may be employed separately from each other when desired. The terms selling station and supply station used herein are terms of business organization or convenience, rather than necessarily designating different locations, and so far as concerns the broad features of the invention, the selling agent and supplying agent might be one person acting in both capacities.

By the invention there is necessarily effected in the business, when a commodity transaction, say a sale, is effected or inaugurated, several inaccessible records, made necessarily, infallibly and involuntarily so far as the sales or like agent is concerned. At the same time there is uttered to such agent commodity identifying means as the necessary instrumentality for receiving the commodity from the supply source to consummate the sale, and this commodity identifying means is necessarily employed by the supplying agent in crediting himself for delivering the commodity to again necessarily, infallibly and involuntarily change the above-described sales record into a like record of the sale and delivery of the commodity.

In my copending application Ser. No. 527,516, a mechanism is shown for involuntarily and inaccessibly controlling and recording and otherwise handling a commodity sale or other commodity transferring transaction, certain of the functions of that mechanism affecting, or dealing with, the supply station. The present invention, in certain of its aspects, is designed to cooperate at the supply station with the invention of my said copending application, as a part of my general method of involuntary and inaccessible business control as already broadly outlined, and cooperates in its functions with those functions of the mechanism of my said copending application which affect the supply station.

More in detail, and having in mind the particular embodied form, the mechanism of my said copending application makes at the supply station two separate involuntary records of a commodity sale or other transaction, and utters a commodity demanding token. The present invention provides for the inaccessible deposition of the commodity demanding token in connection with the supply or delivery of the commodity, and the automatic concomitant, involuntary and inaccessible changing of the previously made records or charges to conform to the delivery of the commodity in connection with the inaccessible deposit of the commodity demanding token.

Referring to the exemplarily embodied mechanisms of the two applications, the automatic controller of application Ser. No. 527,516 makes two records of a sale (as for instance an order for food taken by a waiter) in an annunciator at the supply station (which in such case might be the cook or server in the kitchen) and utters the token standing for, or demanding, the commodity.

This token is the sole means whereby the supply station can make a record of having delivered the commodity sold, and thus clear itself of the charge. That is, the supplying agent by inaccessibly depositing the token infallibly and involuntarily makes a record of the consummation of the sale and the delivery of the goods.

The present application discloses the present preferred mechanism whereby the token when inaccessibly deposited will step back or delete one record of said charge for the commodity made by the automatic controller. It also discloses the mechanism whereby the other record of the sale or order of the commodity which may be utilized for indicating or memoranda purposes, is stepped back or deleted by the cook, or other supplying agent, for his own convenience and guidance in preparing, reserving or supplying the sold or otherwise ordered commodity.

The foregoing general description and the following detailed description, it will be understood, are exemplary and explanatory of the invention, but are not restrictive thereof; and further features of the invention will be primarily set forth in connection with the following detailed description.

In the folowing detailed description of the present preferred embodiment, the mechanism of the token receiver will be first described and then the mechanism of the annunciator or order registering and charging device.

The token receiver mechanism comprises broadly means for receiving and inaccessibly depositing a proper token (the insertion of the token releasing or controlling one cycle of the mechanism) together with means for rejecting and ejecting an improper token; and means automatically stepping back one annunciator record accordingly, so that the delivery of the commodity as evidenced by the token will enable the deletion of the corresponding charge. The cooperating and concomitant functions will be set forth in connection with following detailed statements of the operation.

Referring now in detail to the embodiment of the invention illustrated by way of example in the accompanying drawings, the token-receiving machine is enclosed within a casing 1, which renders the mechanism inaccessible and thereby preserves it against tampering or molestation by unauthorized parties. Portions of the casing are detachably fastened together, such portions being provided with suitable locking means operable by the proper authority, as is later described.

As embodied, the commodity demanding or representing token is received into the machine through a slot 6 in the top plate of casing 1, and passes through the mechanism and in doing so makes certain records inaccessible and involuntary, so far as the person depositing the token is concerned and is finally deposited in a receptacle, which is inaccessible to all persons except to the manager or auditor or other supervising authority.

So far as concerns the broad features of the invention, many different forms of tokens can be used, but as at present embodied, a token 9 (Figs. 13 and 51) is employed which is preferably a flat metal plate of approximately rectangular shape, and may be stamped with the name of a commodity, as at 10 and with an identifying number as shown at 11. The token is shown with the general character and features illustrated and described in my copending application Ser. No. 527,516, filed January 6, 1922. The token is shown with a part 12, shaped to compel the insertion of the token into the machine in the proper or predetermined relative position; and it is provided also with a recess 13, which is utilized in cooperation with the mechanism to carry the token through the machine and to prevent its withdrawal. The token is provided further with identifying means 14, also in the form of apertures, which preferably correspond to or represent the identifying number, and which are placed in predetermined relative positions, and cooperating with an identifying mechanism in the machine, all as hereinafter described.

As embodied the machine is constructed with the two side plates 15 and 16 (Figs. 1, 6, 7 and 8) rigidly fastened together by the shouldered studs 17—17, which act as spacing means, and between which plates are carried the various parts of the mechanism.

The slot 6 communicates with a passageway 18, conveniently disposed vertically in the machine. This passageway is adapted at its upper portion to closely guide the deposited token for the purposes hereinafter described, and at its lower portion is expanded to freely permit the discharge of the token.

The plates 19 and 20 are rigidly attached one to the other and to the side plates 15 and 16, their edges 21 and 22, respectively, serving as a guiding face of the passageway 18. The two angle pieces 23 and 24 are fixed, respectively, to the plates 15 and 16 with their inwardly projecting sides adjacent to the edges 21 and 22 of the plates 19 and 20 and forming two other guiding faces of the passageway 18. Fastened to these pieces 23 and 24, in a suitable manner, are the plates 25 and 26 each projecting beyond the guiding edges of the latter plates so as to present another guiding face of the passageway 18 at its upper portion. As constructed the front and rear guiding faces of the passageway at its upper portion are open to allow access for such mechanisms as coact with, or upon, the token 9.

The front face of the expanded portion of the passageway 18 is preferably shaped up from sheet metal, the upper portion being in the form of a channel 25$^b$ with the projected legs substantially resting against the angle pieces 23 and 24, (see Figs. 1 and 11). Rod 25$^a$ fixed to the side plates 15 and 16 supports the channel 25$^b$. The lower portion 26$^b$ of the sheet metal guide extends downwardly and serves as a guard, and is fastened to a supporting cross rod 26$^a$ fixed to the side frames 15 and 16 in the lower part of the machine.

Means are provided for preventing the insertion of the token into the machine except in the one predetermined position, that is, the position in which the identifying marks on the token will come in proper relation with the identifying mechanism, within the machine, which distinguishes between the right token and wrong token. As embodied (Figs. 1, 6 and 10) said means comprise a roller 27, mounted in the end of an arm 28, which arm is pivoted at 29, and is acted on by a spring 30, under tension, which tends to impel the roller 27 through an aperture into the path of token 9, as shown in the dotted line position of Fig. 10. When the token is inserted with the cutaway end 12 at the forward end and toward the roller 27, the end 12 will cam the roller 27 and arm 28 backwardly to the full line position of Fig. 10, thereby admitting the token past the roller 27 and down the chute 18. It will be further understood that the roller 27 will also act to preserve the alignment of the token 9 by contacting it with the opposing guiding face of the angle piece 24. But if a taken is inserted in any other position, a square or angular end thereof will impinge upon the top of the roller 27 in the dotted line position of Fig. 10, and the roller in that position will act as a stop and will prevent the token being further inserted in the machine.

Means are provided within the machine for engaging with the properly-presented inserted token, and to thereafter control it in its passage through the machine for various purposes or functions, among these being, to prevent the withdrawal of the token after it has once been inserted, and to position the token for the action of the identifying mechanism thereon and further to carry the token to its discharging position. In the embodied form of said means, (Figs. 1, 2, 3, 6 and 11) a carrier 35 is provided for engagement with the hole 13 in the token, and for this purpose it is provided with a nose 36, adjacent to which is a recess with a face 37, which passes beneath the bottom end of the token and acts as an abutment for the inserted token 9.

Suitable supporting and guiding means for the token carrier 35 are provided, and for this purpose it is mounted upon, or has fixed thereto, a pin 38, collars 39 and 40 holding the carrier and pin in the desired position. The opposite ends, respectively, of the pin 38 run in guideways 43 and 44, formed between rear faces of the plate 19 and 20 and the rails 33 and 34, respectively, fastened to the plates 19 and 20. The slots 43 and 44 for a portion at their length are substantially parallel to the passageway 18 and are formed so as to give the requisite and later described movements, properly timed, to the carrier 35.

The token carrier 35 at its bottom end is pivoted to means which serve to move or actuate it, and which also participate in the guiding or positioning of the carrier. As embodied, at its lower end the carrier 35 is pivotally supported on an arm 50, which arm has at its upper end hub 51 (Figs. 11 and 16). Passing through the center of the hub 51, and fast thereto, is a pin 53, which works in slots 54 and 55 formed in the plates 19 and 20, already described. The arm 50 is provided with a bent portion 56 to which is fastened one end of a tension spring 57, the other end thereof being fastened at 58 to the carrier 35. This spring acts to position the carrier 35 as later described.

Pivotally connected to the lower end of the arm 50, at 68, is an arm 69, which arm is pivotally mounted at 70 upon a stud 71, fixed to the side frame 19, (Figs. 1, 2, 3 and 8). The arm 69 has formed thereon or fixed thereto an arm 74 which extends transversely and preferably at right angles thereto, and fastened to arm 74 is one end of a tension spring 75, the other end of which is fastened to a pin 76, which is fixed to the side plate 16 of the machine. This spring is utilized as the propulsive force for carrying the token through the machine, and controlling its movements therein, as is later more fully described. The spring 75 is arranged (see especially Figs. 1, 2 and 3) so that the initial movement of the token in the guideway 18 will carry the spring past the center of the pivot point 70 for the arm 69, and thereafter the spring will tend to propel the carrier 35 and the engaged token downwardly through the machine.

Means are provided by the invention for preventing the withdrawal of the token after it has been inserted in proper position within the machine and has been engaged by the carrier 35. As embodied, there is formed on the arm 69 a tooth 80, with which cooperates a series of notches 81 formed in a spring-pressed and resiliently movable arm 82. This arm is fixed on a hub 83, which is pivoted on a stud 84, fixed to the frame plates 15 and 16. Fixed also to hub 83 is an arm 85, which is spring impelled in a manner later to be described to give the resilient action to arm 82. Arm 82 is thus resiliently impelled to the left, or in a clockwise direction in Figs. 1 and 2, and will yield in the opposite direction, so that the tooth 80 will pass successively into the notches 81, but will be held by them to prevent upward movement of the arms 69 and the carrier 35, and thus it prevents retraction of the token 9 after it has once been inserted in the machine. It will be understood that by the insertion of the token 9 and the impinging action against the face 37 of the carrier 35, the latter is downwardly moved, the guideways 43 and 44 throwing the nose 36 into the hole 13 of the token 9, and thereby locking the latter in the advanced position.

Means are also provided, cooperating with the means just described, for bringing the token to rest for the operation thereon of the token-identifying means. As embodied, there is provided on the arm 69, a stop, shown as a screw 90 threaded through a lug 91 formed upon and extending laterally from the arm 69. A locking nut 92 is preferably utilized to hold the stop 90 in any desired adjusted position. Cooperating with the stop 90 is a suitable detent, and as embodied, an arm 93 has its hub 94 fixed on a shaft 95 rotatably mounted in the side plates 15 and 16. At its lower end, arm 93 has a lug 96, (Figs. 1, 2 and 8), projecting into the path of the screw 90. When the end of the screw 90 engages with the lug 96, arms 69 and carrier 35 are stopped and are held at rest until arm 93 is swung out of the path of the stop 90, when they are again moved ahead by the action of spring 75.

The manner of operation of the mechanism so far described is substantially as follows:—

When the token is properly inserted, it passes the guard roll 27, and is then within the guideway 18 and when sufficiently depressed is in proper position to be operated upon by the token-identifying mechanism, which causes a right token to be inaccessibly deposited within the machine, but ejects any wrong token from the machine. As the token is pushed downwardly (Fig. 1), it engages the face 37 in the carrier 35, and thereby rocks the carrier upon the pin 53, against its spring 57. During this movement, pin 38 rides along the upper sloping part of its guideways 43 and 44, and the nose 36 of the carrier passes into the hole 13 in the token (Fig. 2), and as pin 38 is now in the straight part of the guiding slots 43 and 44, the carrier 35 maintains the relative position with the token 9 and with the nose 36 in the hole 13 in the token. From this point, the token is moved and controlled by the mechanism.

During this movement, the arm 69 has been rocked on its pivot 70, so that through the movement of arm 74, spring 75 is swung from the position of Fig. 1 and approaching the position of Fig. 2, and from this point on it exercises a propulsive force downwardly on arm 69, tending to draw the token downwardly in the passage 18 and through the machine.

As the arm 69 swings downwardly, taking the carrier 35 and token 9 with it, the end of stop pin 90 engages the lug 96 on the arm 93, and the mechanism is brought to rest with the token in position to be operated upon by the token-identifying mechanism, as shown in Fig. 2. It will remain in this position until arm 93 is swung out of the path of the stop pin 90 in the manner to be later described.

Referring now to the embodied form of the token-identifying mechanism, a plurality of pins 100 are mounted in a plate or carrier 101 in positions and spaced apart correspondingly to the identifying holes of the token representing the commodity for which the machine is connected to cooperate with the other machines referred to and which token will coact to perform the functions hereinbefore and hereinafter described. It will be understood that the various tokens for the different commodities are differentiated from each other by variations in the positions and spacings apart of the identifying holes therein, and it will be clear that when the token is in the position just described, that the identifying pins in the machine and the identifying holes in the token will be in register. On the other hand, any other arrangement of identifying holes than that of the right token would be out of register with one or more of the identifying pins of the machine.

For the purpose of making the mechanism adaptable for use for any one of many different commodities, that is, where particularly marked or perforated tokens are used for particular commodities, the plates 101 are interchangeably or replaceably mounted on the mechanism. As embodied, plate 101 is provided at its bottom end with recesses 104 and 105, (see also Fig. 7), which seat on correspondingly shaped and positioned lugs 106 and 107, formed on a carrier plate 108. The plate 101 is provided at its upper end with a recess 109, into which projects a correspondingly shaped end of a pin 110, which pin is mounted in a bracket 111, fixed on the carrier plate 108. Pin 110 is acted on by a spring 112, in compression between the bracket 111 and a collar 113 on the pin. The pin is, therefore, manually retractable to permit the pin plate 101 to be drawn out past it, and to permit another pin plate, with a different arrangement of pins if desired, to be inserted. The recesses and lugs will hold the pin plate in absolute registered position. The relative positions of lugs and recesses are such as to require the proper positioning of plate 101 on carrier plate 108.

As embodied, the carrier for the token-identifying means is reciprocably mounted to effect the identifying function, and for this purpose bent plates 116 and 117 are fastened to the inside surface of the carrier 108 (Figs. 1, 2, 5, 6 and 7) their inner edges 118 and 119, respectively, serving as side guides for the pin plate 101. Plates 116ᵃ and 117ᵃ are fastened respectively to plates 116 and 117, serving to retain the carrier plate 108. The plates 116 and 117 extend outwardly, and are apertured at 121 and 122, to receive guiding and supporting rods 123 and 124, and are then bent backwardly and again inwardly, as shown in Figs. 1, 2, 6 and 7, at 125 and 126, to form a second bearing upon the rods 123 and 124. Rods 123 and 124 are fastened into the end plate 127 which is fast to the side plates 15 and 16.

The embodied form of actuating mechanism therefor comprises an arm 136, with its end within, and pivotally connected by a pin 138 to a slotted lug 137, projecting from the back of the carrier plate 108. Lever arm 136 has a hub 139 fixed on a shaft 140 mounted in the side plates 15 and 16 of the machine. Fixed also to shaft 140 is the hub 141 of an arm 142, which is provided with a cam roller 143, which cooperates with a cam 144 on a cam shaft 145 journaled in the machine side plates. Arm 142 is acted on by a tension spring 147, fixed to the arm at 148 and to the machine frame at 149. The spring 147 impels the identifying mechanism into engaging position with the token (as shown in Figs. 2 and 5), and the cam 144 operates to move it to and fro and to hold it in retracted position (as shown in Fig. 1).

The cooperating mechanism for inaccessibly depositing the right token, and for ejecting from the machine the wrong token, comprises a double chute, having a guideway 158 for the right token and a guideway 159 for the wrong token. These guideways are closely adjoining at their upper ends, and are set at an angle with respect to each other, so that their lower ends are separated, as will be seen from Figs. 1, 2 and 5. This mechanism is pivotally mounted on a rod 160, which is mounted in the side plates 15 and 16 of the machine by means of a sleeve 161, fast on the rod 160, the sleeve being cut away to form seats for the chutes and to which seats the latter are fastened, as will be seen from Figs. 1 and 7.

Beneath the chute 158 is a chamber or receptacle 163 (for the right token), which chamber is inaccessible from the exterior of the machine and can be reached only by unlocking the machine casing. Cooperating with the chute 159 (for the wrong token) is a passageway 164, terminating in a slide 165, open to the exterior of the machine casing. With the machine at rest the upper end of the passageway 159 is in position to receive a wrong token while the operation of the token-identifying means upon a right token will cause the passageway 158 to be brought beneath the passageway 18; thus the wrong tokens will be ejected from the machine and the right tokens inaccessibly deposited within the machine.

Fixed to the sleeve 161 is a plate 166, which is apertured at 167, at its lower end, to freely straddle a stop pin 168, projecting from the machine frame. A tension spring 170 is fastened at one end to plate 166 and at the other end to the machine frame at 171, and tends to keep the wrong token chute 159 beneath the passageway 18.

Pivotally connected to the upper end of the plate 166 is a link 174, by a pin and slot connection 175. At its other end 176, the link 174 is pivotally connected to a lever 177, which lever is pivotally supported on a stud 178, fixed on the side plate 15 of the frame. At its upper end 179, lever 177 is pivoted to a link 180, which link at its opposite end is pivoted to a stud 181, fixed to and projecting from the arm 136.

At its upper end, plate 166 is formed in a detent tooth 184, and cooperating therewith is the notched end 185 of a bell-crank lever 186, pivoted at 187 on a stud 188, which stud is mounted upon the frame plate 15. The other arm 190 of the lever 186 is provided with a cam face 191, which cooperates with a pin 192 on cam 250. A spring $192^a$, under tension, has one end attached to the arm 185, the other being held by a pin 193 fixed to the side frame 15, and tends to keep the notched end 185 in cooperative contact with the tooth 184.

The manner of operation of the token-identifying mechanism is substantially as follows:—

Assuming that a right token has been inserted into the machine, and has reached the desired position, and cam shaft 145 has been set in motion by mechanism later to be described, cam roller 143 rides off the high part of cam 144, and spring 147 pulls lever 142 downwardly (in Figs. 1 and 2), and as a right token is in position, as shown in Fig. 2, the pins 100 will be in exact registry with the holes 14, and will pass therethrough.

During this movement, the chute 158 will be rocked from the position of Fig. 1 to that of Fig. 2, and thus will be in receiving position for the token beneath the lower end of the passageway 18. As the cam roller 143 encounters the high part of cam 144, arm 142 will be swung upwardly, and the token identifying mechanism will be moved from right to left from the position of Fig. 2 to that of Fig. 1, and the pins 100 will recede clear of the token 9.

As the token has not yet been deposited, it is essential that the chute 158 be retained in position to receive it, and this has been effected by the rocking of the plate 166 from the position of Fig. 1 to that of Fig. 2, which brings the detent tooth 184 behind the notch 185 of the lever 186, and spring $192^a$ will snap the notch behind the tooth, and will hold the chute 158 in position to receive the right token from the passage 18 and deliver it into the inaccessible receptacle 163. The chute can remain in this position after the return of the identifying mechanism by reason of the pin and slot connection 175.

After the token has been so delivered, pin 192 will engage the cam face 191, and thereby will rock lever 186 and release plate 166, which is then swung backwardly under the impulsion of spring 170 from the position of Fig. 2 to that of Fig. 1. This movement will again bring the chute 159 into receiving position beneath the passageway 18.

Assuming that a wrong token has been inserted in the chute 18, in the position of Fig. 1, as it is pushed in it will be engaged by the carrier 35 and brought to the identifying position. Again the passage of roller 143 from the high part to the low part of cam 144 will cause spring 147 to impel arm 136 and the pins 100 to the right in Fig. 1. But as one or more of the holes 14 in the token are not in register with the pins 100, the pins cannot pass therethrough and the mechanism will remain in the position of Fig. 5. In this position chute 159 is still beneath the lower end of the guideway 18, and when the token passes through the machine it will be rejected and will be discharged onto the slide 165 and be accessible for removal.

Means are provided for moving the stop lug 96 out of the way of the stop pin 90 after the identifying mechanism has operated on the token so that the token may be passed on to be deposited within or rejected from the machine. In the embodied form thereof, arm 93 has its hub 94 fixed to shaft 95 (Figs. 1, 2, 3 and 8), the hub 94 having a lug 205 projecting therefrom. An arm 206 is fixed to the opposite end of the shaft 95. Pivotally connected to the free end of arm 206 at 207 is a link 208, which at its other end 209 is pivoted to an arm 210. Arm 210 has its hub 211 loosely mounted on a stud 212, fixed to the frame plate 15. Fixed also to the hub 211 is an arm 214, having a cam roller 215 running on a cam 216, which is fixed on cam shaft 145. A spring 217, under tension, has one end fastened at 207 and the other end carried by a pin 218 fast in the side plate 15. A pin 219, fixed in the side plate 16 is adapted to act as a stop for the lug 205, thereby giving the desired position to the stop lug 96.

After the operation of identifying the token has been completed, the mechanism just described will rock arm 93 to take stop lug 96 out of the path of stop screw 90 (that is from the position of Fig 1 to the position of Fig. 3), thereby again permitting arm 69 and token carrier 35 to move forward under the impulsion of spring 75. The mechanism will hold stop lug 96 in this retracted position until the arm 69 has again passed upwardly, on its return movement, as is hereinafter described, to the position of Fig. 1. After arm 69 has been restored, the cam 216 will permit spring 217 to return the mechanism to present lug 96 in the stopping position for arm 69.

The mechanism just described serves in part to rock back, that is, to move out of engaging position, the locking mechanism, that is, to move the notches 81 away from the path of travel of tooth 80 on the return, or clockwise movement of the arm 69. As embodied, the arm 85 has at its free end a pin 220, projecting through a slot 221 which is formed in the link 208, and arm 85 is thereby spring-pressed within the slot by a spring 222 under tension, one end of which is attached to the pin 220, the other end being carried by a pin 223 fast in the link 208. Thus when the tooth 80 passes into engagement with the notches 81 there will be a resilient spring yield which will permit the tooth to pass and will cause each successive notch to hold the tooth, but when the mechanism is operated to spring the lug 96 out of the path of the stop 90, pin 220 will be in the bottom of slot 221, and as link 208 is moving upwardly, arm 82 with the notches 81 will be positively swung out of the path of the tooth 80.

Means are provided by the invention for disengaging the token carrier 35 from the token just prior to its deposition within, or its ejection from, the machine and for returning the carrier 35 to position to cooperate with the next succeeding token. As embodied, the guiding slots 43 and 44 are inclined at their bottom ends to permit the carrier 35 to rock backwardly under the impulsion of spring 57 upon its pivot 53, that is, in the clockwise direction in Fig. 3, which shows the carrier just at the point of beginning this movement, which movement is shown clearly in Fig. 4 at its completion. This movement withdraws the nose 36 of the carrier from the hole 13 in the token and carries the face 37 from beneath the token, and leaves the token free to drop.

The above-described disengaging movement of the carrier 35, under the operation of the spring 57, is limited by a stop pin 228, mounted on the arm 50, and cooperating with a tail 229 on the carrier 35. The carrier is in this position when the upward or return movement of the arm 69 from approximately the position of Fig. 3 to that of Fig. 1 is begun.

The relative position of the token carrier 35 as it passes upwardly from the token releasing position (Fig. 4) to the position for receiving a new token (as shown in Fig. 1) is shown in dot and dash line in Fig. 4. In this position the guiding pin 38 is adjacent to the external edge of rails 33 and 34, and means are provided for readmitting the ends of the pins again into the top ends of the slots 43 and 44, preparatory to the next downward movement with the next succeeding inserted token.

As embodied, the upper ends of the slots 43 and 44, that is the inclined portions, are formed on one side, respectively, by plates 235 and 236, slidable respectively in guideways in plates 237 and 238, which plates are mounted on the upper part of the plates 19 and 20. Fixed to, and projecting across between the plates 235 and 236 is a pin 240, which is straddled by the notched end 241 of a lever arm 242, the hub 243 of which is loosely mounted on shaft 95 (see also Fig. 9). Fixed also to the hub 243 is an arm 244, and fixed to and projecting from arm 244 is a pin 245, which pin is straddled by the notched end of a lever 246, the hub 247 of which is loosely mounted on a stud 212, supported in the machine frame. The other end of lever 246 is provided with a cam roller 249, which runs on a cam 250 fixed on cam shaft 145. The plates 235 and 236 are positioned, as shown in Fig. 2, by means of a pin 256 contacting with a face 257 of the recess 258 formed in the plate 237. This desirably locates the carrier in its token-receptive position.

Means are provided for restoring the arm 69 and therewith the token carrier 35 and certain cooperating parts, from the token releasing position of Fig. 3 to the receiving position of Fig. 1 against the tension of the spring 75. As embodied, a geared sector 260 is formed on the hub of lever arm 69, and cooperating therewith is a sector gear 261, formed in the end of a lever 262, the hub 263 of which lever is loosely mounted on a shaft 264, which shaft is mounted on the machine frames.

In connection therewith, means are provided for regulating the travel or path of arm 69, and as embodied, a lever arm 268 has its hub 269 likewise loosely mounted on shaft 264 (see Figs. 2 and 8). Arm 262 has its lower end 270, on the opposite side of its hub, in contact with the arm 268, and there is a slot and screw adjustment 271 therebetween. In like manner, the arm 268 has its end 272 extending beyond its hub and in contact with the arm 262, and there is a screw and slot adjustment 273 therebetween. Where it is desired to once adjust a particular machine and thereafter to maintain it in such adjustment, after the screw and slot adjustments 271 and 273 are made, the arms can be permanently fastened together in some suitable manner, as by one or more rivets 274.

The arm 268 carries a cam roller 275 which cooperates with a cam 276 fixed on cam shaft 145. It will be clear that when arm 69 is being propelled downwardly by spring 75, the cam 276 permitting, arm 262 will move with it, and that on the return movement arm 262 will be swung by its cam, and by reason of the gear connection 260—261, it will swing arm 69 upwardly and therewith the token carrier 35, and will bring the latter in readiness to be driven into the token-receiving position.

Means are provided for preventing the insertion into the mechanism of a second token before the mechanism has completed its cycle for a previously inserted token. As embodied (Figs. 1 and 3), a bar or plate 312 is pivotally connected at 313 to a three armed lever 314, which is pivotally mounted on a rod 315 fast in the plates 19 and 20. The locking member 312 rests loosely upon a support 316, so as to be horizontally slidable into and out of the top end of the chute or guideway for the tokens. The arm 317 of lever 314 is acted on by spring 318, tending to impel the locking member 312 into the token chute or guideway. The remaining arm 319 of lever 314 is in position to be operated by the token carrier 35 so as to move the lever control in a manner to permit the admission of a token into the chute in the manner described.

This locking device operates as follows:

When the mechanism is at rest, the collar 40 is in contact with a lever 314 (Fig. 1), which latter is thereby swung against the tension of spring 318 so that the member 312 is clear of the chute, and a token may be inserted, as shown in Fig. 1. The token is then engaged and drawn down into the machine in the manner already described, the collar 40 and the other mechanism traveling downwardly therewith. This leaves the lever 314 free to respond to the action of spring 318, and locking member 312 is projected into position to close the guideway or chute as soon as the token 9 has passed. It remains in this position, locking the guideway against access to another token, until the collar 40 and all the other mechanism has completed its cycle, which brings the collar 40 again to its completed operation upon the lever 314 and has retracted it to the position of Fig. 1, leaving the guideway open for the insertion of a new token.

Manually operable means, preferably a switch, is provided which is mounted as a matter of convenience operatively adjacent to the token receiving unit, whereby the supplying agent may at will step back or delete one of the records of sales, or analogous transactions, which have been made by the automatic controller. As an instance, in the case of a restaurant, if there were four orders showing on the proper annunciator dial for a particular dish, the cook could note the number of orders and by operating the switch could step back this particular dial to zero and would then proceed with the preparation of that number of orders. When he looked at the dial again, if it showed three orders, he would know that they were additional orders to those which he was preparing, and this avoids any necessity for remembering or for calculation on the part of the cook, and practically avoids possibility of an error of mental calculation.

As embodied, a plunger switch 295 (Figs. 1, 14 and 25) is mounted in a socket 296 carried in the top casing of the token receiver, a coil spring 297 keeping the switch in the open position. The blade 298 of the switch is preferably electrically insulated by means of block 301, and in the open circuit position is between a pair of blades 299 constituting one terminal of the circuit and are depressible between a pair of blades 300 to complete the circuit and to actuate the annunciator. The further circuit connections will be later described.

To provide access by the authorized controlling authority, such as an auditor or inspector, the casing of each token receiving unit, or of a battery of such units, is provided with hinged doors or closures, which are provided with either individual or general locking means preferably for the top and also for the front. In the present embodiment, locking means are provided for a battery of the receivers although obviously the same means can be applied to each one individually. The top 304 of the unit casing (Fig. 1), is hinged at 305, and the lower portion of the front 306 is hinged at 307 so that these may be opened together or independently of each other. The closures for a battery of units will be described later. The lower front 306 is provided with a chute or receptacle 308 into which the chute for the rejected tokens opens, as shown in Fig. 1, thus permitting the front 306 to drop down without disturbing the token depository, which may thereafter be removed.

In Figs. 26 to 28 are shown the present preferred embodiment of the mounting of a battery of the token receiving units, together with both manual and power operated actuating means therefor, and also a form of general locking means for the entire battery. In Fig. 17 a perspective view is shown of a table or stand enclosing and supporting a battery of six token receiving units, which may be for a single commodity or for different commodities. As an illustration, the present embodiment shows the serving table or counter usually between the dispenser or chef and the selling agent or waiter as the support for the mechanisms. In the most convenient arrangement, the corresponding annunciator or like mechanisms are arranged just above, and are carried on pillars 330 supported on the table top 331 shown in Fig. 17 (and also Figs. 47 and 48). In Figs. 17, 18 and 25 a table top 331, supported on legs, is shown with a portion cut away to receive the unit casing therethrough, the top plate or lid 332 for all units contained within the casing, corresponding to the individual top plate 304. As embodied, this lid practically becomes a part of the table top. The casing or enclosure for the units consists of a base or bottom plate 335 to which is suitably fastened stanchions 334, fixed to the underside of the table top 331. It will be understood that the unit casing entirely encloses the mechanisms as well as the token receptacle 163.

The receptacle 308 is shown projecting through an opening in the table side, which opening is suitably arranged with respect to the unit casing to permit the dropping of the part 306, thus providing for a convenient removal of the token depository 163.

Vertically disposed and transversely arranged partitions 336, rest on and in supports 337 in the bottom plate 335 of the general unit or units casing (Figs. 25 and 26). The details of this construction need not be fully described. Mounted on the partition plate 336 are vertically disposed guidways 338, which are formed and positioned to receive the corners of the corresponding token-receiving unit. That is, the corners of the plates 15 and 16, shown in Figs. 6, 7, 8 and 14, will fit and slide within the angled guideways 338 of Fig. 26, sliding in perpendicularly to the plane of the paper. That is, the units will slide in from the top of Fig. 25 downwardly until they rest upon the plate 335.

In the embodied form of means whereby the inaccessible deposition of the commodity demanding token in the receiver mechanism involuntarily and inaccessibly deletes or steps back the inaccessible record of sales or other commodity transactions in the anunciator or equivalent mechanism to correspond to the deposition of the token, the device is electrically operated in the token receiver, although this could be effected mechanically or otherwise as desired. This device is opened and closed by the token and the mechanisms cooperating therewith.

The embodied form of electrical connections therefor comprises a pair of spring contacts 340 (Figs. 14 and 25) mounted on a block 340$^a$, preferably of insulating material, which is fixed to the partitions 336, 336, into which contacts slides a circuit terminal blade 341, which is mounted on a block 341$^a$, preferably of insulating material, fixed to the side plates 15 and 16 of the unit mechanism, which blade is connected to one arm of the switch 344 by wire 345. Cooperating with the spring switch contact 344 (Figs. 1, 2, 5 and 7) is a spring switch contact 346, communicating by a wire 347 with a circuit terminal blade 348, mounted on block 341$^a$, which makes connection with a circuit spring contact 349, mounted on the block 340$^a$, when the token depositing unit is in position.

The switch members 344 and 346 are each electrically independently mounted on a block 360, preferably of insulating material and which is fixed to the side plate 16. These switch members are in open circuit position, as shown in Fig. 1, except when actuated by the token receiver mechanism cooperating with a deposited token, as shown in Fig. 2. Fixed on the lever 136 is an arm 350, having an insulating finger 351 thereon, which is operatively adjacent to the switch member 344. From Figs. 1 and 2 it will be seen that when the right token is deposited, and pins 100 pass therethrough, arm 136 will be swung sufficiently to the right in Fig. 2 so that finger 351 will close the switch and there will be the required involuntary and inaccessible operation of the annunciator record of sales or other commodity transaction. That is, the inaccessible record in the annunciator will be stepped back one unit to correspond with the deposition of the right token.

It will be evident that with a wrong token in position to be acted upon by the plate 101 (Fig. 5), the arm 136 will not be permitted to rotate sufficiently to make contact between the switch members 344 and 346, and in consequence there will be no operation of the annunciator record.

Means are provided to prevent the actuation of the arm 136 if the shaft 145 is operating without a token having been deposited in the slot 101. In the embodied form the lever 142 has a suitably shaped face 364 at its free end.

Fixed on the hub 263 of the lever 262 is an arm 365 with a bent portion 366 at its free end so disposed as to be in the path of the face 364 when the machine is at rest. From the foregoing description, it will be evident that the arm 262 will remain at rest if no token has been deposited and if under this condition the shaft 145 is rotated.

The cam 144 will permit the arm 142 to drop, but the face 364 of the lever 142 will contact with the bent portion 366 of the arm 365, and will arrest the arm 142 and thereby prevent contact between the switch members 344 and 346.

The manually operated switch 295 is provided with a terminal blade 354 fixed on the block 341ª, which fits into a pair of terminals 355, fixed on the block 340ª, when the unit is in place as shown in Fig. 14, so that one record in the annunciator can be stepped back at will by the supplying agent as already described. The piece 367 (Figs. 14 and 15) electrically connects the spring terminal 300 with prong 341 and one of the wires of the circuits embracing switches 295 and 344.

In the embodied form of locking means for maintaining the token receivers inaccessible from those operating them, these means are applied to the entire battery of token receivers, but are obviously applicable in like manner to a single receiver. As embodied (Figs. 17, 23, 24 and 25), a key 370 operates a lock 371 in the general casing. This key is adapted to rotate a cylinder or other rotatable member 372, mounted in the lock, and constructed in any usual or known manner to safe-guard against false keys. To the outer end of this member 372, externally to the lock, is mounted a cam disc 373. In contact with this disc (see also Fig. 23) is a cam roller 374, mounted on a lever 375, which lever is fixed on a shaft 376, journaled in plates 379, horizontally disposed beneath the units and within the casing, and which serves as the hinge rod at 307.

Fixed on the shaft 376 are one or more arms 377 (Figs. 23 and 25), a suitable stop pin 378 mounted in plate 379 limiting the movement of the arm in one direction. The free end of the arm 377 is in engagement with one arm 380 of a three arm lever which is pivoted at 381 on the plate 379. The arm 382 of this lever is provided with a hook which fits into a notched pin 383 on the swinging portions of the front plate 306 of the unit or battery of units to lock the front plate in closed position. The lever is impelled into the locking position by a spring 384, fast to a pin 385 in the lever and to a pin 386 fixed in plate 379. This pin 386 also acts as a stop for the arm 380 of the lever, to position it so that the bevel nose of the arm 382 will snap automatically into locking position with reference to the notched pin 383 to lock the front 306 whenever it is closed.

The arm 390 of the lever actuates and controls the locking mechanism for the top 304, or 332, respectively, of the unit or battery of units. This arm 390 is pivotally connected to a vertically extending rod 391 (Figs. 19, 21 and 23). At its upper end rod 391 is pivotally connected to an arm 392 of a bell crank lever pivoted at 393 upon the frame of the general casing of the unit. The lever has its arm 394 terminating in a bevel hook engaging in a notched pin 395 fixed to the top 304 or 332. The locking lever is acted on by a spring 396 connected to the lever at 397 and to a pin 398 fixed to the frame, a pin 399 limiting the action of the spring. Thus the closing of the top 304 will automatically lock it.

It will be clear that by turning key 370 both the front and top of the casing may be unlocked and that each of these will lock again automatically on being closed.

The embodied form of operating means for the mechanism of the token receivers is shown applied to a battery of the receivers, that is, a single power means is preferably employed, any particular machine being fully operated by the general power means by the insertion thereinto of the right token. As embodied, the shaft 145 (Figs. 1, 2 and 22) is shown hollow and is adapted to receive a longitudinally slidable shaft 420, which is insertible endwise of the battery into and through the successively arranged token depositing units or a single unit. The shaft 420 (Figs. 1, 3 and 22) is provided with keys 421, preferably beveled at their forward end to fit into internal key ways 422 formed on the interior of each of the hollow shafts 145. The hollow shafts 145 are individual to each of the token depositing units and are journaled, respectively, in the side plates 15 and 16 of each particular unit.

A plate 126 and a plate 436 (Figs. 17, 18, 20, 21 and 22) are desirably spaced apart and held together, as a unitary structure, by the horizontally disposed rods 438, 438. The plate 436 is fixed to the outer partition plate 336 by means of bolts 439, the distance collars 440 maintaining the desired spacing therebetween. Bushings 441, 441, fixed in the plates 426 and 436, act as bearings for the shaft 420 and are in operative alignment with the hollow shafts 145 of each unit.

The shaft 420 is provided at its rear end with a collar 425, adapted to fit against the outer face of the flange of the bushing 441, and a locking lever 427 is pivoted at 428 on the plate 426, and fits into an annular groove 429 on the end of the shaft to hold the shaft against longitudinal displacement. The lever is provided with a finger piece 430 to move it to and fro, and the shaft is preferably provided with a knurled head 431 to turn or withdraw it, as may be desired. A spring 427$^a$, under tension, is fixed at 427$^b$ on the lever 427 to insure its cooperative engagement with the shaft 420.

Referring primarily to the embodied form of the attendant operating mechanism for rotating the cam shaft 145, a foot pedal 450 is fixed on a shaft 451, journaled at 452 and 453 upon the general table structure. The lever is held to initial position by a tension spring 449 and its travel is limited in either direction, respectively, by adjusting screws 448 and 447. Fixed to shaft 451 is an arm 454, and pivotally connected to the end of the arm is a rod 455. Rod 455 at its opposite end is pivoted to an arm 456, which arm is pivotally supported at 457 on the plate 426 of the unitary structure. Carried by the arm 456 is a geared sector 459, meshing with a pinion 460, fixed on a shaft 461, journaled in the plates 426 and 436. Loosely mounted on shaft 461 is a geared sector 465, meshing with a pinion 466 loose on a hollow shaft 467 which is rotatively mounted in the bushings 441, 441, but shouldered to prevent axial movement. The shaft 467 is adapted to receive the shaft 420 and is provided with a keyway 468 to receive a key 469 fixed to the shaft 420 for the purpose of driving the latter.

The stroke of the gear sector 465, operated by the pedal 450, gives a single revolution to the shafts 420 and 467 and therewith to the shaft 145, to effect one cycle of the token depositing machine. In connection therewith means are provided for driving and compelling a complete stroke of the sector 465 and a consequent complete rotation of the shaft 145 before the mechanism can be returned. As embodied, fixed on shaft 461 is a sector 470, which is provided with a series of one way ratchet or detent teeth 471. A spring 472 with one end fixed to the frame at 473 and the other end thereof fixed to the sector 470, tends to impel the sector back to initial position, that is, in clockwise direction in Fig. 19. A pin 474 is fixed in the sector and projects through an opening 475 in the gear sector 465. A spring 476 is in tension between the pin 474 and a pin 478 fixed in the gear sector 465 for the purpose of carrying the sector 465 with the sector 470 when the latter is rotated, and also to permit a certain amount of resilient motion between the two sectors.

A yielding detent pawl formed on the end of one arm of a three arm lever 480 is pivoted at 481 on the plate 436, and has a tooth 482 spring impelled into the ratchet teeth 471 on the sector 470. An arm 483 of the lever 480 is acted on by a spring 484 in tension therebetween and a pin 485, fixed in the plate 436. The detent lever 480 has also an upwardly extending tripping arm 486. A controlling lever 490 for the detent lever 480 is provided, which is pivoted at 491 on the plate 436. This lever 490 has an arm 492, to which is connected a spring 493, under tension, which has its other end fixed to a pin 494 fixed in the plate 436. This spring tends to keep an arm 495 of the lever in engagement with a pin 496, fixed in the sector 470. The other arm 497 of the lever 490 projects backwardly and has a hook 499 at its free end operatively positioned relatively to a bent portion 500 of the arm 486 for coaction therewith. A pin 501 is fixed in the sector 470 operatively placed for coaction with the tripping arm 486 when desired.

The operation of the driving means, as illustrated, is as follows:

The depression of the pedal 450 will, through the connected mechanism rotate the sector 470 in an anti-clockwise direction, the detent 480 engaging the teeth 471 to prevent, at this time, backward rotation. The sector 465 is carried with the sector 470, through the cooperation of the pin 474, slot 475 and spring 476. Arm 495 is freed by reason of the pin 496 being carried away therefrom, and the hooked portion 497 contacting with the bent portion 500, but in a manner not interfering with the detent action of the pawl 480.

The pinion 466 and the hollow shaft 467 is driven by the sector 465, and when the pinion 466 has completed approximately a full revolution, the pin 501 engages arm 486, disengaging the pawl 482 and permitting the hook 497 to engage and hold the arm 486 in the position to keep the tooth 482 out of engagement with the toothed portion 471. During the return of the pedal 450 to its upward position of rest, the sector 470 rotates in a clockwise direction and the pin 496 disengages the hook 497, thus permitting the detent 480 to assume its operative position relative to the teeth 471.

Means are provided by the invention whereby the actuating mechanism for the shaft 420 is returned idly, the shaft itself making one rotation forwardly and remaining at rest during the restoring movement of the actuating mechanism. As embodied (Figs. 19, 20 and 21), the pinion 466 is fixed to a sleeve 510 loosely mounted on shaft 467. Fixed to the sleeve 510 is a plate 511 (by a rivet 509 passing through the pinion 466, flange 508 on the sleeve and through the plate 511) to which is pivoted at 512 a pawl 513. The pawl 513 engages with a notch 515 in a disc 516, fixed on a sleeve 517, which sleeve is fastened on the shaft 467 by suitable means, such as a clamping screw 518. The pawl is held in yielding engaging position with its notch by a spring 520, in tension between a pin 521 mounted on the pawl and a pin 522 mounted on its carrying disc 511.

A detent pawl is also provided for preventing backward rotation of the shafts 420 and 467, and as embodied, a detent pawl 525 is pivoted at 526 on the plate 436, and engages with a tooth 527 formed in a disc 528, fixed to the sleeve 517. Pawl 525 is yieldingly held into its notch by a spring 530, in tension between a pin 531 on the pawl and a pin 532 in plate 436.

Means are provided for permitting the pinion 466 to make a substantially complete revolution, and then to rotate on its return idle movement to the same starting point for the next successive revolution. As embodied, a pin 535 projects from the side of the pinion 466 into the path of a stop 536, which is pivoted upon a support 537, carried on the frame plate 426. The forward end of the stop 536 is in the path of the pin 535. Stop 536 is provided with two wings 539 and 540, with which cooperate, respectively, two stop pins 541 and 542, fixed to the frame plate 426. The tail 543 of the stop is acted upon by a spring 544 in tension between it and a pin 545, fixed to frame plate 426. This spring will yieldingly permit the stop 536 to be thrown against one or the other of the stops 541 and 542 to which it is driven by the pin 535 as is hereinafter described.

The manner of operation of the mechanism just described is substantially as follows:

The operative or attendant as for instance, the cook in a restaurant, after he has delivered a commodity to a waiter and taken in exchange therefor the token demanding that commodity, deposits the token in the proper slot as already described. He steps upon the lever 450, and through the mechanism previously described, geared sector 465 rotates pinion 466 and therewith the shaft 420 for one revolution, operating the token depositor through one complete cycle as already described. At the beginning of this operation, pin 535 and stop 536 are in the position of Fig. 19, but at the end of this operation pin 535 is in the same position as in Fig. 19, but it is on the lower side of the stop 536, the stop having been rocked from the position of Fig. 19 until the arm 539 is against the stop 541, thereby permitting the pinion 466 to make substantially one complete revolution. The spring 544 is adapted to yieldingly maintain the stop 536 in substantially a neutral position when not in contact with the pin 535, that is during the rotation of the pinion 466. Thus the opposed faces of the stop 536 are in the path of the pin 535 and the stop 536 may be rocked thereby against either the stop pin 540 or the stop pin 541 depending on the direction of rotation of the pinion 466.

In the meantime the ratchet 471 will prevent the return of the mechanism until shaft 420 has made a complete revolution, whereupon pawl tooth 482 is moved out of ratchet 471, and the mechanism is free to return under the impulsion of springs 472. The mechanism will return idle, the pinion 466 rotating idly on shaft 467 by reason of the pawl and ratchet connection 513 and 516, the pawl 525 preventing any backward rotation of the shaft 467. At the end of the idle return reverse rotation of the pinion 466, the pin 535 will strike the stop 536 on the upper side, and will rotate it downwardly until the wing 540 strikes the stop 542, and thereby the pinion 466 will be brought back to the position (Fig. 19) in which it was at the beginning of the rotation.

Referring now to the embodied form of power actuating means for the mechanism (Figs. 27 and 28 in connection with those last described), a motor 560 is mounted on the general table structure, it being understood that parts 454 and 455 are omitted. The motor is connected by any suitable or convenient type of reduction gearing 561 with a gear wheel 562 on a shaft 563. Connected in said shaft is a suitable form of slip or friction gear 564, and a one-revolution clutch 565. The loose member 566 of the clutch has fixed thereto a cam 567. Cooperating with the cam 567 is a cam roll 568, carried on a lever 569, which lever is pivoted at 570 upon a support 571, fixed to the table frame. A spring 572 holds the lever to its cam. The tail 574 of the lever 569 cooperates with a pin 573 in the arm 456 of the geared sector 459, already described.

A manually operated release is provided, whereby the motor will give one actuation to the mechanism just described to give the shaft 420 one rotation, and to bring it to rest, similarly with the attendant or workman operated mechanism previously described. As embodied, a plunger 580 is mounted in the table top, and is kept in raised position by a coil spring 581, pocketed in the table, and operating against a collar 582 on the rod 583 of the plunger. The rod 583 on its lower end is provided with a spring-pressed pivoted toe 584, which is located and proportioned to trip and then to escape a lever 585, which lever is pivoted at 586 upon a bracket 587, mounted on the underside of the table top.

The lever 585 has pivoted to its opposite end 588 a finger 589, which finger projects into a cam groove 590 in the movable clutch member 565. This clutch member is impelled into the engaging position with the clutch member 566 by a spring 591, coiled about the shaft 563 in compression between the clutch member 565 and a collar 592 fixed on the shaft. When the plunger 580 is pressed, lever 585 is rocked, and pin 589 is lifted out of the cam groove 590. Clutch member 565 is thereby released and thrown into engagement with clutch member 566 and the motor 560 actuates the gear sector 459 and the entire mechanism as already described.

When plunger 580 is depressed, lever 585 after being rocked, immediately escapes and is returned independently of the plunger 580, by means of its spring 594, so that if the plunger 580 were held down there would be but one revolution of the shaft 420, irrespective of this fact. By reason of the release of the lever 585, spring 594 presses pin 589 yieldingly downwardly, and pin 589 is pressed into the wide part of the cam groove 590. When it strikes the cam face 595, it cams the clutch member 565 to the right in Fig. 28, and out from the clutch member 566, and the mechanism is brought to rest, the cam 567 having given a complete reciprocation and return idle movement to the sector 465, and a like rotary movement to the pinion 466, and the cooperating and connected parts, as previously described.

Referring now to the mechanism or mechanisms which cooperate with the automatic or other controller to record the sale or other commodity affecting transaction and later or in conjunction therewith to record the delivery of the sold commodity or the equivalent transaction which satisfies or balances the first transaction. In other words, as applied to the present preferred exemplary and explanatory embodiment, an annunciator mechanism is provided which records the sales by automatic operation from the automatically operating controller at the sales station, and announces the sale to the supplying agent, and when the supplying agent has consummated the sale by delivering the goods, the annunciator inaccessibly and involutarily records the delivery through the deposit of the commodity demanding token which was uttered by the controller at the time of recording the sale.

While the term "annunciator" is used herein for want of a more apt term, it will be clear that the mechanism so designated is much more than, and widely different from, ordinary annunciator mechaninsms, and the use of the term in the specification and claims will be so understood. The mechanism automatically makes two inaccessible involuntary records of a sale or other transaction at the sales station and again automatically makes an inaccessible involuntary record of the delivery from the supply station of the commodity so sold or otherwise affected, and at the same time announces the sale or order at the supply station from the sales station and serves also as a personal record of the status of his work for the supplying agent. By the term "involutary" record is meant that the record is made independently of the will or memory or attention of the agents transacting the business. In order to make the sale and to deliver the commodity the record is infallibly and necessarily made by the mechanism. Nor need the "sale" and "supply" be distantly located from each other so far as the successful and efficient operation of the invention is concerned, as in fact they may be closely contiguous and operate essentially in the same manner.

In the embodied form of the annunciator mechanism (Figs. 29 to 46) cooperating in the present embodiment with the embodied form of token receiver mechanism just described, a battery of annunciators is provided equal in number to the token receivers, one particular annunciator unit being connected with, and cooperating with, a given token receiving unit. The detailed description of a single unit will be sufficient. The annunciator unit shown and described in the present application in most of its features is the same as, or substantially identical with, that shown in my copending application Serial Number 449,560 filed March 3, 1921, with some features of improvement therein, the present application showing more in detail the present preferred practical means of coordination and cooperation between the annunciator and the token receiving units and also between these and the automatic controller.

The connection and cooperation between the annunciator mechanism and the automatic controller mechanism is indicated herein in diagram, but is brought out in detail in my copending application Serial Number 527,516 filed Jan. 6, 1922, and is also indicated and described in my copending application Serial Number 449,560, already referred to, and also in my copending application Serial Number 283,817 filed March 20, 1919.

In the present preferred embodiment of the annunciator mechanism, there are two visual records of each sale or other commodity handling transaction, which is recorded involuntarily and inaccessibly in the controller and is also recorded in like manner in the annunciator. There is also in the annunciator means cooperating with the token receiver whereby the deposition of the commodity demanding or representing token involuntarily and inaccessibly makes a corresponding deletion or stepping back of one of the inaccessible records in the annunciator. The remaining record in the annunciator is stepped back or deleted at the volition of the person responsible for the dispensing or other handling of the commodity at the supply station, as for instance in the illustrative applied case, of the cook in the restaurant. This record is used to keep track of orders to be prepared in the manner already described.

The other features of the annunciator are designed to cooperate with the foregoing, and will be brought out in connection with the following detailed and specific description. It will be understood that both the preceding general description and the following detailed description are illustrative and explanatory of the principles of the invention but are not restrictive thereof.

Referring now in detail to the embodied exemplary mechanism of the annunciator, it will be understood that each unit separately, or the battery of units together, are inaccessibly encased and locked so that their records are accessible only to an auditor, inspector, or other proper supervising authority.

Referring now to the mechanism of an individual unit of this exemplary embodiment, a base 630 is provided having a front plate 631, the particular features of which will be later described. In the embodied form of means actuated automatically by the controller for automatically making the record in the annunciator, at the forward end of the mechanism (Figs. 29, 30 and 33 to 38), there is mounted a bracket 632 supported on the bed plate and having upwardly extending legs 633 and 634. Supported in the upper end of these bracket arms is a rod 635, in suitable manner, as by screws 636 and 637. Sleeved on the rod 635 is a hollow shaft 638, this shaft being a part, as stated, of the mechanism which is actuated from the automatic controller to make the inaccessible record and also from the token receiver to delete or set back the record so made.

Fixed on the hollow shaft 638 is a ratchet wheel 639 (Figs. 29, 32, 36 and 38) and cooperating therewith is an actuating pawl 640 adapted to impart to the ratchet wheel a tooth by tooth feed. The feed pawl 640 is pivotally connected at 641 to an actuating lever 642, which lever is fixed to an armature carrier 652, which has a hollow sleeve portion 654. This sleeve 654 is journaled on a rod 643, which rod is supported in a bracket 644, having a base 645 and upwardly extending arms 646 and 647, and which is mounted on the base plate 630.

The embodied form of means for operating this mechanism from the automatic controller is electro-magnetic, and the armature carrier 652 is provided with an armature 653. Cooperating with the armature 653 is a magnet 654, supported on a bracket 655, carried on the base 630. The circuit and circuit controls for this magnet are described later herein, and also are described in my said copending application Ser. No. 527,516. In Figs. 49, 50 and 53 hereof, the switch 654a corresponds to the commutator switch 751 fully shown and described in the said copending application Serial No. 527,516.

Referring now in detail to the recording mechanism which is operated by the mechanisms just described, that is, which is stepped forward by the automatic controller and which is stepped back by the deposited token, there is mounted on the hollow shaft 638 a driving and escaping wheel 660 (Figs. 29, 30, 37, 38, 40 and 41) having a long hub 661 sleeved on the hollow shaft 638, and turning with the shaft but slidable therealong. For this purpose there is a keyway 662 formed in the shaft, a key 663 being slidable in the keyway and being fixed to the sleeve hub 661 of the wheel.

This driving and escapement wheel is so constructed itself and the cooperating mechanisms are likewise so constructed that the making of a new record of a sale and other commodity transaction from the controller mechanism and the deletion or stepping back of an old record by the token receiver mechanism, either involuntarily within the machine, or at the will of the attendant, operations may take place simultaneously or independently of each other, whenever they occur in the business, and are not limited by the mechanism. That is, if a sale were recorded from the controller and a sale record deleted by the token receiver at the same time, the mechanism would take care of both.

As embodied, cooperating with the wheel 660 is a member having a tooth 666 and a tooth 667 mounted thereon in a fixed relation with respect to the wheel and to each other, which will be later described, which member may conveniently be the flat end of the spring drum cylinder 668. The spring drum 668 is fixed to a hub 669, sleeved loosely on the hollow shaft 638. Within the spring drum 668 is a spiral spring 670, one end of the spring being fastened at 671 to the drum 668, a flat plate 672 being employed to keep the spring in position within the drum.

The inner end of the spring is fixed at 673 to a stationary bushing 674, mounted upon the rod 635, and held in position by a screw 676. The spring is wound up during the stepping forward of the drum and acts to step the drum back when the escapement is operated for this purpose.

On the circular periphery of the drum 668 are a series 680 of numerals, usually from zero to 9, which are positioned so that the numeral at zero or initial position will show through an aperture or window 681 in the front plate 631 of the annunciator unit, the numerals corresponding to the teeth of the ratchet wheel 639 and to those of the driving and escaping wheel 660. Each unit is preferably provided also with a finishing or outside plate 683 (see Fig. 34), having an aperture 684, corresponding to the aperture 681, through which the numeral dial shows. This plate is also preferably provided with an opening at the top for a card 685 which may bear, in the exemplary case of a restaurant, the name and number of a dish or other commodity, corresponding to the automatic controller mechanism to which the annunciator is connected.

Means are provided for causing the pawl 640 to remain in operative position with respect to the ratchet wheel 639 and to feed or advance it a single tooth for each energizing of the magnet 654. The pawl 640 is provided on its back with a bevel portion 687, which is adapted to engage with a face 688 on a stud 689 fixed on the base 630 and which cooperative action will prevent the overthrow of the ratchet wheel 639. A tension spring 690 is fixed to a pin 691 on the pawl 640 and to a pin 692 on the lever 642 to hold the pawl resiliently to the ratchet wheel. To restore the lever 642 after it has been actuated, a tension spring 694 is fast to a pin 695 on the lever 642 and to a pin 696 on the bracket 655, thus bringing the lever 642 back when magnet 654 is deenergized. A detent lever 697 is pivoted at 698 on the stud 689, and is yieldingly in engagement with the teeth of ratchet wheel 639 by means of a spring 699, fixed to a pin 700 on the detent lever and to a pin 701 in the stud 689.

Referring now to the mechanism for stepping back the drum 668, as embodied (Figs. 29, 33, 37 and 38, 42 and 43), in the sleeve 661 of the driving and escapement wheel 660 is an annular groove 710, into which projects a stud 711, fixed in the end of a lever 712. Lever 712 is pivoted on a stud 713, which is set into the bracket 655 and at its top is fastened by a screw 714 to a rod or bar 715 extending from the front plate 631 to the bracket 644 at the rear and fast thereto. Lever 712 has an arm 716, carrying an armature 717 of a magnet 718, which magnet in the present instance is in circuit with the switch contacts 344 and 346 of the token receiving mechanism. Magnet 718 is mounted on a cross bar 719 carried on the arms 646 and 647 of the bracket 644.

The mechanism just described is maintained resiliently in the open circuit position by spring 724, connected to the arm 716 of the lever and to a plate 725, which is fixed to the bar 715. A pin 726 serves as a stop for the lever 712 so that the sleeve 710 will not bind on the ratchet wheel 639. This pin does the same for the corresponding mechanism on the other side of the ratchet wheel.

The manner of operation of the mechanism just described is substantially as follows:

When magnet 654 is energized from the automatic controller, or other source, pawl 640 will feed ratchet wheel 639 ahead one tooth, and this will advance the drum 668 one number at the window 684.

When the commodity demanding token is deposited in the token receiver, switch 344, 346 is energized, thereby energizing magnet 718, and lever 712 is swung upwardly in Fig. 29 and to the left in Figs. 27 and 28. This slides the wheel 660 along shaft 638 without changing its angular relation to the shaft. It will be noted from Figs. 37 and 38 that wheel 660 when magnet 718 is deenergized, is in engagement with tooth 666 the tooth being pressed against the corresponding tooth of the wheel by the spring 670 (Fig. 37). At this time the wheel 660 is free from the tooth 667. As the wheel 660 is slid to the left in Figs. 37 and 38 it passes out of engagement with the tooth 666 and just prior to this it passes into line with the tooth 667, this position being shown for the corresponding mechanism in Fig. 48.

These two teeth are angularly separated from each other sufficiently to allow on one complete reciprocatory movement, a backward movement of the wheel 660 for one tooth, corresponding to the space between two adjacent numbers 680 on the drum 668. Just as the wheel 660 passes out of engagement with the tooth 666 the tooth face 666$^a$ will pass into engagement with the face 667$^a$ of pin or tooth 667 (Figs. 37 to 39), permitting the drum 668 to step backwardly a part of the angular distance just mentioned. As magnet 718 is deenergized, wheel 660 is slid backwardly to the right in Figs. 37 and 38, and just before passing out of engagement with the tooth 667 it passes into engagement again with the tooth 666 (the opposite mechanism being illustrated by Fig. 42), coming again to the position of Fig. 39, but positioned angularly one tooth back from where it was before the stepping back movement was started. Thereby the number 680 showing through the window 684 (Figs. 34 and 39) has been stepped back one number. It will be seen that if magnets 654 and 718 were energized simultaneously, the forward feed of shaft 638 and the back-stepping escapement movement just described would occur at the same time, and as a sale is thus added and another simultaneously subtracted, the numeral drum would receive no complete angular movement, and the same number would show through the window 684, thereby correctly representing the transaction.

Means are provided for storing the record when running into numbers higher than the digits, and as shown a tens wheel has been added, and a hundreds wheel and higher wheels can be added in the same manner as desired.

In the embodied form of transferring the tens from the unit wheel to the tens wheel, a gear wheel 730 is fixed on the flat side of the spring drum 668 (Figs. 29, 32, 33 and 37 to 41), this gear wheel meshing with a gear wheel 732. These gears are both interrupted and are further designed to give a feed adapted to effect a favorable operation of the intermittent feed of the drum. The gear wheel 730 is provided with a gear portion 733 and with a smooth peripheral portion 734, and at either side between these parts there are depressions 735 and 736.

The gear wheel 732 is provided with a gear portion 737 and with two teeth 738 and 739, adapted to engage, respectively, with the depressions 375 and 376, and having their external surfaces 740 and 741, respectively, curved to fit the smooth peripheral portion 734 of the gear wheel 730. Thus gear wheel 732 would rotate while the gear portions 733 and 737 are in mesh, but gear wheel 732 will be at rest while the surfaces 740 and 741 are in contact with the smooth peripheral portion 734 of rotating gear wheel 730. That is, gear wheel 730 rotates with drum 668, but gear wheel 732 rotates only during a portion of a revolution of the gear wheel 730.

Gear wheel 732 is fixed on a shaft 745, journaled in the arms 746 and 747 of a bracket supported on the base plate 630. Fixed also (Fig. 33) to shaft 745 is the one tooth disc 750 of Geneva movement, the other disc 751 thereof being fixed on the exterior flat face of a drum 752 for the tens numbers. Drum 752 is fixed to a sleeve 753, which sleeve is loose on the bushing 674. This movement operates in the usual manner for such movements, the tens drum being advanced or stepped back one number each time the units drum completes a revolution either forwardly or backwardly.

The mechanism for making the other record which is also effected through the operation of the automatic controller, and which record is stepped back voluntarily by the agent at the supply station (such for instance as the cook, as already described) may be the same or generally similar in construction to that already described. A driving and escapement wheel 754 is mounted on the hollow shaft 638 to rotate therewith but to slide therealong by means of a keyway 755 in the shaft and a key 756 fixed in the sleeve hub 767 of the wheel. The hub is provided with an annular groove 768 into which projects a stud 769 on a lever 770, which lever is pivoted also on the stud 713, but so as to have its movement independently of the lever 712. A spring 770$^a$, under tension, has one end attached to a pin 770$^b$, fixed on lever 770, the other end being fast to the plate 725 and resiliently maintaining the armature 772 in the open circuit position.

Lever 770 has an arm 771 provided with an armature 772, with which cooperates the magnet 773, which is mounted on the bar 719. This magnet is in a suitable circuit for operation by the supply agent, such as the plunger switch 295 shown in Fig. 1. Cooperating with a wheel 754 are driving and escapement teeth 778 and 779, corresponding to the teeth 666 and 667 already described. These teeth are fast upon the face of the spring drum 780, having the spring 781 therewithin, one end thereof being fastened to the drum by a suitable pin 782 and the other end thereof being fastened by a pin 783 to a bushing 784, surrounding the rod 635 and held in fixed position by a screw 785, fixed in the bracket arm 634. The drum 780 is fixed on a sleeve 786 loose on the hollow shaft 638.

The drum 780 has on its peripheral surface a series of numerals 790, shown from zero to 9 which show through an opening 791 in the front plate 683.

The operation of the mechanism just described will be understood from that of the previous similar mechanism, which has just been described.

Means are provided by the invention whereby the record disc which is voluntarily stepped back by the supplying agent may not be stepped back beyond zero. That is, for example, if the cook in a restaurant had five orders showing as unprepared through the opening 791, if he should close the stepping back switch six times instead of five, the disc would not be permitted to pass beyond zero. In the embodied form of this mechanism, a roller 800 is fixed on the inner face of the drum 780. Just as the drum reaches the position shown in Fig. 31, this roller engages with an arm 801, fixed on a sleeve 802, which sleeve is loose on a rod 803, the rod being supported in the bracket arm 634 and in a bracket arm 804.

Fixed also to the sleeve 802 is an arm 806 provided with a switch blade 807, insulated therefrom (Figs. 29, 34 and 36). Switch blade 807 makes and breaks the circuit for magnet 773 through contact prongs 808. The switch members 807 and 808 are held resiliently in circuit-closing position by a spring 809, in tension between a pin 810 on the switch arm 806 and a pin 811 on the base plate 630. When the roller 800 strikes the arm 801, as shown in Fig. 29, switch blade 807 is lifted and breaks the circuit at 808.

This occurs during the stepping back movement of the drum 780 between one and zero, so that if the hand-operated switch by which the magnet 773 is energized be again closed, it cannot rotate or step back the drum farther than to have the zero show in window 791, as shown in Fig. 34. Whenever the drum is stepped forward by energizing the magnet 654, the roller 800 will pass in counter-clockwise direction in Fig. 31 away from the arm 801, and spring 809 will close the switch 807, permitting the energizing of magnet 773 by the supply agent to again step back the drum 780.

In certain cases, as for instance, where a single disc is used for making a record, means may be provided for preventing an overthrow of the record beyond the top or highest number indicated by the drum. It will be understood that the number of drums and the numerals on the drums will be ample for any particular business with which the mechanism is connected. In the embodied form, mechanism is shown applied to the drum 780 for preventing the drum being fed forward beyond the numeral 9. In the embodied form thereof, the roller 800 (Figs. 28, 29 and 34 to 36) is employed for this purpose also.

An arm 812 is fixed on a sleeve 813, loose on the rod 803, with which arm the roller 800 cooperates. Fixed to arm 812 is an insulated piece 814, to which is connected a switch blade 815. This switch blade makes and breaks at the terminals 816 the circuit for the magnet 773. The switch 815 is held resiliently in the open-circuit position by a spring 817, in tension between a pin 818 on the arm 812 and a pin 819 mounted on the bracket arm 804.

Thus when roller 800 engages arm 812, switch 815 is closed, and magnet 773 is energized to step back the drum 780, and this movement of the drum 780 moves the roller 800 away from arm 812, and spring 817 immediately opens the switch 815 and magnet 773 is thus deenergized. Thus an overthrow of the drum 780 beyond its indicating capacity is prevented.

Means are provided for occularly indicating the status of the record or indicating means, and the status or condition of the supply of commodities. That is, means are provided in connection with the volutary deletable or stepping back record to indicate orders which have not been taken up by the supply agent, that is, orders reported since he last stepped back the voluntary record. Means are also provided for occularly indicating outstanding orders for which no tokens have been deposited, which might be called undelivered orders, or their equivalent. The occular indicating means in this case, as embodied, are lamps 824 and 825.

The lamp 824 in the present instance relates to the voluntary step back record. A blade 826, fixed on the insulated block 827 on the arm 806, makes and breaks at the terminals 829 the circuit for the lamp 824. When drum 780 is at zero position, and switch 826 is open, the light is out, indicating that there are no orders recorded by the automatic controller which have not been taken note of and stepped back by the supply agent. As soon as new orders are recorded on the drum 780, switch 826 will close the circuit under the action of spring 809, and lamp 824 will be lighted.

Referring now to the embodied form of means, in connection with the inaccessible order or transaction record, which is stepped back by the deposit of the token in the token receiver, a roller 830 (see Figs. 36 and 39) is mounted on the gear wheel 732 and cooperates with a lever 831, fixed on a sleeve 832, which sleeve is pivoted on a supporting stud 833, carried in the bracket arm 746. Fixed to sleeve 832 is an arm 834, carrying an insulating block 835, which block carries a switch blade 836, which makes and breaks the circuit terminals 837.

The arm 834 extends backwardly and is provided with a notch 840 into which is fastened a spring 841, which is also fastened to a pin 842, fixed to the bracket arm 746. This spring resiliently impels the switch 836 into circuit-closing position.

On the Geneva wheel 751 (Fig. 33) is a pin 845, adapted to engage with a lever 846, which lever is fixed to a sleeve 847, pivoted on a support 848, the support being carried by the bracket arm 747. Fixed also to sleeve 847 is an arm 850, carrying an insulating block 851, to which block is fixed a switch blade 852, which makes and breaks the circuit at the terminals 853. Arm 850 extends backwardly from its pivot point, and has a notch 856 into which is fastened a spring 857, the other end of which spring is fastened to a pin 858, fixed to the bracket arm 747, the spring resiliently pressing the switch 852 into circuit closing position. Both these switches are in circuit with the lamp 825, the switches being in parallel.

When the units drum 668 leaves the zero position, roller 830, which has held switch 836 open, passes out of contact with arm 831, and under the action of spring 841 switch 836 is closed, and lamp 825 will be lighted. This will continue during the remainder of the revolution of the drum 668. During this time switch 852 is held in the opening position by the pin 845 engaging the lever 846, as shown in Fig. 33. As roller 830 comes again to zero position when the drum 668 has made a complete revolution, the roller 830 will again open the switch 836. But at this time by reason of drum 752 being moved forward one step, pin 845 has passed out of engagement with lever 846, and spring 857 has closed switch 852, and lamp 825 will continue lighted, notwithstanding that the roller 830 is again at the position shown in Fig. 39. When, however, by the deposit of the proper number of tokens drum 668 and drum 752 are both brought to the zero position, both switches 836 and 852 will be in the open-circuit position, as shown in Figs. 33 and 39, and light 825 will be extinguished, showing that tokens have been deposited in the token receiver for all orders which have been recorded, by the automatic controller.

If desired, an aural signal may be provided to indicate the making of a record by the automatic controller or other source of orders or other commodity transactions. As embodied, (Figs. 32, 36 and 38) a bell 860 is employed, one terminal 861 in its circuit being mounted in an insulating block 862 on the bed plate 630 and another terminal 863 in the circuit being also mounted on the block 862 and insulated one from the other. An insulated block 864 is mounted on the lever 642, and each time the lever 642 is actuated by the magnet 654, the circuit will be closed between the terminals 861 and 863, and the bell 860 will be sounded.

In my copending application Ser. No. 527,516 for the automatic controller, already referred to, means are described for preventing the actuation of the controller to record orders, as for instance in a restaurant, either on the guest check within the controller itself and also on the annunciator, wherever the supply of a commodity has been exhausted at the supply station. In the embodied form of means for effecting this, a switch 867 (Figs. 44, 45 and 48) is provided, conveniently mounted on the annunciator general casing, or at other convenient location for controlling the circuit, which actuates the locking mechanism of my said copending application, as shown in Figs. 37 and 38 thereof. The magnets 900 and 901 shown in Figs. 49, 52 and 53 herein in connection with the locking switch, are the same as the magnets 581 and 604 respectively in Fig. 37 of said copending application Serial No. 527,516.

The automatic controller consists of a machine which prints an order on a guest check, transmits an electric impulse to the magnet 654 of the annunciator to record the order at the supply station and utters a token which may be exchanged for the order at the supply station and which the cook or other agent at the supply station deposits in the token receiver to delete the record controlled by the magnet 718. The insertion of the guest check in the controller automatically ejects the token and actuates the annunciator to record the sale.

As shown in Fig. 53, a vertical shaft 902 is driven through a friction clutch 903 from a source of energy (not shown). Normally, said shaft is prevented from turning by a dog 904 engaging a tooth 905 on a collar 906 secured to the shaft. When a guest check is inserted in the controller, the dog is swung clear of the tooth 905, by mechanism that will be described below, permitting the shaft 902 to turn. The tooth 905 then strikes an arm 907 of the dog, thereby resetting the dog to again arrest the shaft after the latter has turned through a predetermined angle. The guest check is fitted in a frame 908 which is inserted through a slot 909 in the casing 910 of the controller. The casing and the slot therein are shown by broken lines in the drawing. The frame 908 strikes a finger 911 carried by a spring-pressed lever 912 swinging the latter on its fulcrum. The lever 912 strikes an arm 913 of a bellcrank lever 914 causing the latter, in turn, to depress a latch pin 904' which normally holds the dog 904 in engagement with the tooth 905. When the pin 904' is depressed, the dog is swung by a spring 907' clear of the tooth 905. The commutator switch 654a is actuated by thus turning the shaft 902.

A gear fixed to the shaft 902 drives a gear 915 and the latter, through a pitman 464a and suitable ratchet mechanism, such as indicated in Fig. 51, angularly advances a plate 497a pivoted beneath the bottom plate 490a of the token mechanism. Vertical frames 508 carried by the plate 490a support stacks of tokens 9. The plate 490a is formed with openings which register with the stacks and the plate 497a is formed with corresponding openings so that, as the latter plate is angularly advanced, it will pick off tokens from the bottom of each stack. At each step of its movement, one of the tokens will be moved over an opening 512a in the base of the controller and will be conveyed by gravity to a cup or other suitable receptacle (not shown), readily accessible to the operator of the automatic controller. Each token, as it is dispensed from the machine, is counted on a suitable counting device 915a which is operated by engagement of a pin 464b on gear 915 with a lever 915b.

When the tokens are nearing exhaustion, a warning signal is actuated. To this end a pair of spring fingers 916 is provided which form the terminals of an electric signal circuit. A follower block 917 rests on the tokens in the token reservoir and a pin 918 projects from the block. When the tokens near exhaustion, this pin presses the fingers together, completing the signal circuit and actuating the signal. The block also carries a pin 919 which, when the tokens are exhausted, strikes and tilts a lever 920 and through suitable connections, including a connecting rod 921, it lifts a latch 922 out of engagement with a crank arm 923. The latter is urged by a spring 924 to raise a pin 600a into one of a pair of guide rails 925 in which the frame 908 of the guest check is inserted. The pin, when raised, will bar the insertion of a guest check in the controller and thus preventing further operation of the controller until the supply of tokens has been replenished.

The stop pin 600a may also be raised into locking position from the supply station, by actuating the switch 867 to close the circuit of the magnet 900. The latter, when thus energized, attracts an armature 926 and urges a bar 927 toward the right as viewed in Fig. 53. This releases an arm 928 which is tilted by a spring 929 sufficiently for the end of the arm 928 to abut against the end of the bar 927, preventing the latter from returning. When the commodity at the supply station has been replenished, the switch 867 is turned further to energize the magnet 901. The latter then pulls the arm 928 clear of the bar. A spring acting on an arm 930 to which the bar 927 and the armature 926 are secured will then return the bar to normal position. Whenever the pin 600a is raised to prevent operation of the automatic controller, an arm 931, through associated connecting mechanism, displays a signal 932.

Thus, by inserting a guest check into the controller, the latter is operated to issue a token, to make a record of the issue of the token, and at the same time to operate the annunciator to record the order, and not only will the controller be automatically rendered inoperative when the supply of tokens is exhausted, but also the controller may be rendered inoperative or operative at will from the supply station.

In Figs. 44 to 48 hereof the general casing and mounting for a battery of annunciators is shown. The general frame of the casing is provided with guideways 868, into which the annunciator units are slid horizontally as shown in Fig. 44. As shown in Figs. 45 and 47, respectively, when the units are in position, the front closure is constituted partly by the respective front plates 683 of the units through which the record dials show.

When the units are slid into the general frame, their electrical connections are automatically made by a series of terminal blades 870 for the various circuits of the unit, the blades being mounted upon a bar 871 of insulating material, carried on the bracket arms 646 and 647, the respective switch blades 870 fitting into corresponding spring terminals 872 carried on the casing structure.

Means are provided for locking the various units within the case, and as embodied a lock 876 is provided, the key thereof operating a rotatable cam disc 877. This cam disc has in engagement therewith a cam roller 878, mounted on an arm 879, fixed to a shaft 880, which shaft is carried in bearings 881, mounted on the casing frame. Fixed on the shaft are a series of locking hooks 884, engaging, respectively, with locking depressions 885 on the bar 715 of each of the units. Each of the locking hooks 884 has a tail 886, acted on by a spring 887, which resiliently presses the hooks to cause the units to lock automatically when pushed into place in the casing.

The general operation of the mechanism is substantially as follows:—

The waiter, or other selling agent, secures the token 9 from the automatic controller (parts of which are shown in Figs. 51 and 53, and which is fully shown and described in my copending application Ser. No. 527, 516) and makes the sales record during that operation.

The token is inserted in the slot 6 in the top of the machine (Fig. 1) and is engaged by carrier 35 and is carried down to the selecting position.

At this point the token is acted on by the identifying pins 100. A wrong token is ejected from the machine without causing the machine to operate. A right token is directed through the mechanism, and inaccessibly deposited. If it is a right token, switch 344—346 closes its circuit and correspondingly operates the annunciator mechanism, as described in detail in connection with the mechanism.

The plunger switch 295 enables the cook, or other supplying agent, to step back one of the records of sales which have been made by the automatic controller, thereby providing a record for the supplying agent showing the stage of the work of supply as compared to the orders.

From all the foregoing it will be understood that a mechanism and combination and cooperation of mechanisms has been provided embodying the principles of the invention and realizing the objects and advantages set forth, together with other objects and advantages; and that departures may be made from the constructions shown and described without departing from the principles of the invention and without sacrificing its chief advantages.

What I claim is:—

1. A commodity purveying controlling mechanism including in combination means for receiving and inaccessibly depositing a commodity identifying token, means for registering the deposition of the token, and means for preventing the registration of any token identifying a different commodity.

2. A commodity purveying controlling mechanism including in combination means for receiving and inaccessibly depositing a commodity identifying token, means for counting the deposition of the token, and means for preventing the counting of any token identifying a different commodity.

3. A commodity purveying controlling mechanism including in combination means for receiving and inaccessibly depositing a commodity identifying token, mechanism for deducting the token as it is deposited from a charged total of tokens, and means for preventing any token identifying a different commodity from operating said deducting mechanism.

4. A commodity purveying controlling mechanism including in combination means for receiving and inaccessibly depositing a commodity identifying token, and means for preventing the withdrawal of a partly received token.

5. A commodity purveying controlling mechanism including in combination means for receiving and inaccessibly depositing a commodity identifying token, and means operating automatically by the insertion of a token for preventing the withdrawal of a partly received token.

6. A commodity purveying controlling mechanism including in combination means for receiving a commodity identifying token having identification holes, an inaccessible depository for the token, identifying means cooperating with the identification holes on the token to prevent or to permit its deposition in the depository.

7. A commodity purveying controlling mechanism including in combination means for receiving a commodity identifying token having identification holes, an inaccessible depository for the token, identifying means cooperating with the identification holes on the token to prevent or to permit its deposition in the depository and means controlled by the identifying means for counting only the deposited tokens.

8. A commodity purveying controlling mechanism including in combination means for receiving a commodity identifying token having identification marks, an inaccessible depository for the token, identifying means cooperating with the identification marks on the token to prevent or to permit its deposition in the depository and means controlled by the identifying means for registering only the deposited tokens.

9. A commodity purveying controlling mechanism including in combination means for receiving a commodity identifying token having identification marks, means for preventing the withdrawal of a received token, an inaccessible depository for the token, identifying means cooperating with the identification marks on the token to prevent or to permit its deposition in the depository, said means for preventing withdrawal of the token serving also to present the token to the identifying means.

10. A commodity purveying controlling mechanism including in combination means for receiving a commodity identifying token having identification marks, means for preventing the withdrawal of a received token, an inaccessible depository for the token, identifying means cooperating with the identification marks on the token to prevent or to permit its deposition in the depository, said means for preventing withdrawal of a token serving also to present the token to the identifying means and means for counting only the deposited tokens.

11. A commodity purveying controlling mechanism including in combination means for receiving a commodity identifying token having identification marks, means for preventing the withdrawal of a received token, an inaccessible depository for the token, identifying means cooperating with the identification marks on the token to prevent or to permit its deposition in the depository, said means for preventing withdrawal of a token serving also to present the token to the identifying means and means controlled by the identifying means for counting only the deposited tokens.

12. A commodity purveying controlling mechanism including in combination means for registering a commodity sale, means for depositing a commodity identifying token to delete the registration of the sale, and means for controlling the issue of commodity identifying tokens by the operation of first-named means.

13. A commodity purveying controlling mechanism including in combination means for registering a commodity sale and uttering a commodity identifying token, and means for depositing said token to delete the registration of the sale.

14. A commodity purveying controlling mechanism including in combination means for uttering a commodity identifying token at a sales station and making a registration of a sale at a supply station and means at the supply station operated by the deposit of the token for deleting the registration of the sale at the supply station.

15. A commodity purveying controlling mechanism including in combination commodity transaction registering means at a supply station, means at a sales station for registering a transaction in said registering means and for providing means for obtaining the commodity at the supply station and for changing said registration to cover also the delivery of the commodity.

16. A commodity purveying controlling mechanism including in combination commodity transaction registering means at a supply station, means at a sales station for registering a commodity sale in said registering means and for providing means for obtaining the commodity at the supply station and for changing said sales registration to cover also the delivery of the commodity.

17. A commodity purveying controlling mechanism including in combination means for registering commodity sales and issuing a commodity identifying token at each registration, and means controlled by said token for modifying said registration to make it a registration of commodities remaining undelivered pursuant to said sales.

18. A commodity purveying controlling mechanism including in combination a controller having an inaccessible supply of commodity identifying tokens and having means for making a registration of a sale at a supply station and uttering a token for obtaining the sold commodity from the supplying agent, and means requiring the supplying agent to deposit said taken to change a registration of the sale into a registration of delivery of the commodity.

19. A commodity purveying controlling mechanism including in combination means for registering a commodity sale and thereby uttering a commodity representing token, means for automatically deleting the registration of the sale by the inaccessible deposition of the token and devices preventing the deletion of the registration by the operation of the mechanism unless a token is deposited.

20. A commodity purveying controlling mechanism including in combination a plurality of mechanisms including means for registering commodity sales and thereby uttering a commodity representing token, means for deleting the registration of a sale by the deposit of the token, common operating means therefor, and devices for preventing the deletion of a registration except in a mechanism wherein a token has been deposited.

21. A commodity purveying controlling mechanism including a register, advancing means for operating the register in one direction, reversing means for operating the register in the opposite direction, and means supplied by operation of the advancing means for actuating the reversing means.

22. A commodity purveying controlling mechanism including means at a sales station for registering a commodity sale at a supply station and uttering a token for obtaining the sold commodity, stop mechanism at the sales station for preventing operation of said means, and means at the supply station for controlling the stop mechanism.

In testimony whereof, I have signed my name to this specification.

HARRY RUSSELL BRAND.